Aug. 21, 1956  J. A. V. TURCK  2,759,671
KEY-RESPONSIVE ADDING AND SUBTRACTING CALCULATING MACHINE
Filed Dec. 28, 1950  14 Sheets-Sheet 3

Aug. 21, 1956   J. A. V. TURCK   2,759,671
KEY-RESPONSIVE ADDING AND SUBTRACTING CALCULATING MACHINE
Filed Dec. 28, 1950   14 Sheets-Sheet 7
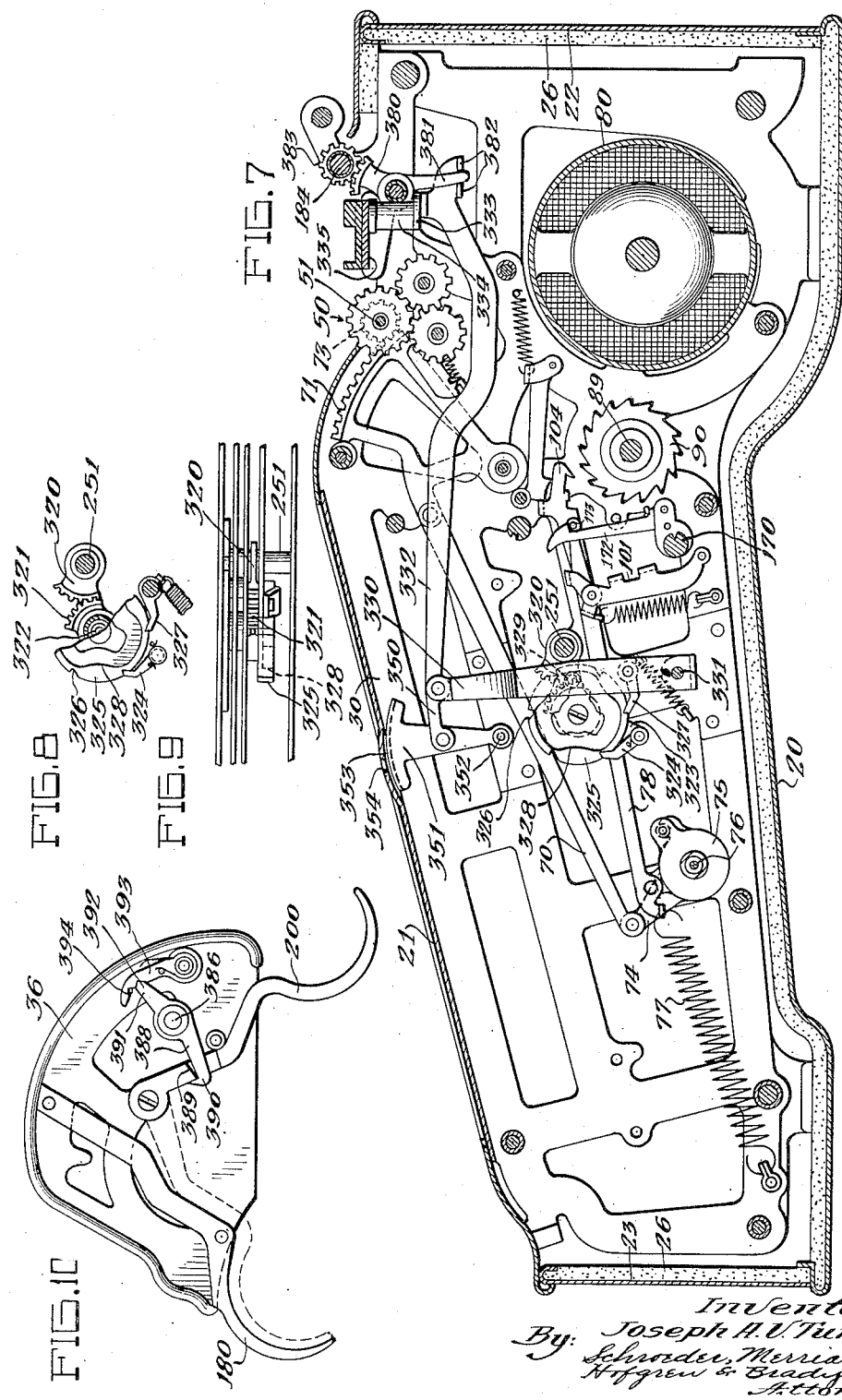
Inventor:
By: Joseph A. V. Turck
Schroeder, Merriam,
Hofgren & Brady
Attorneys Aug. 21, 1956                  J. A. V. TURCK                  2,759,671
           KEY-RESPONSIVE ADDING AND SUBTRACTING CALCULATING MACHINE
Filed Dec. 28, 1950                                    14 Sheets-Sheet 8
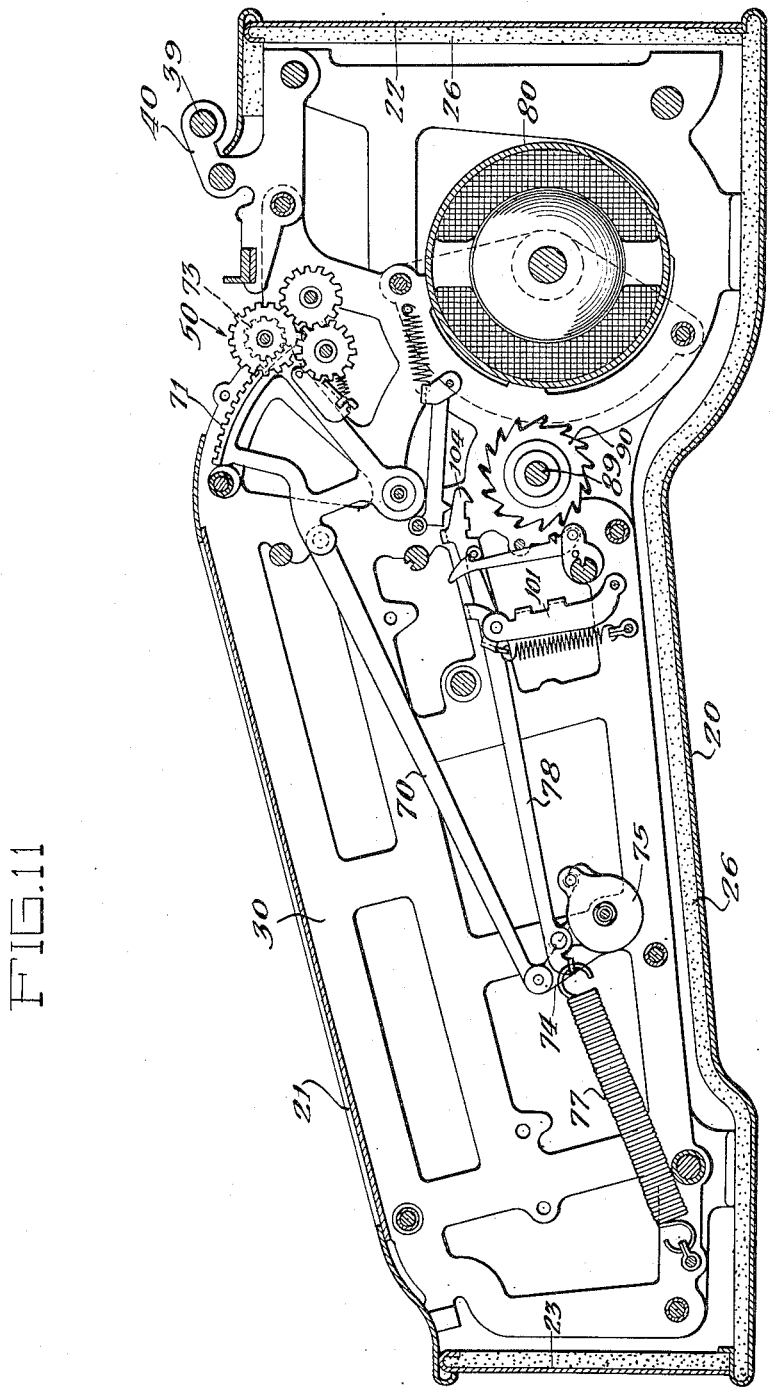
Inventor:
Joseph A. V. Turck
By: Schroeder, Merriam,
Hofgren & Brady
Attorneys

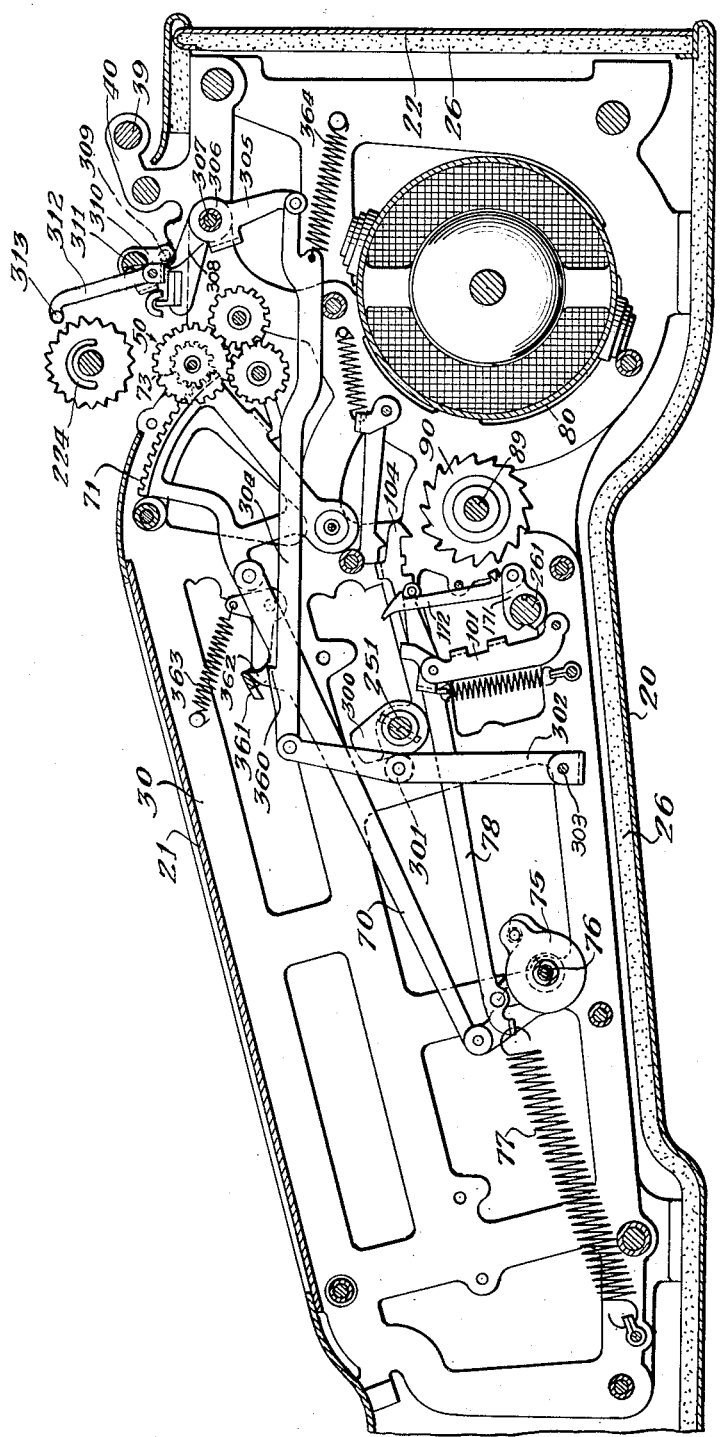

Aug. 21, 1956 J. A. V. TURCK 2,759,671
KEY-RESPONSIVE ADDING AND SUBTRACTING CALCULATING MACHINE
Filed Dec. 28, 1950 14 Sheets-Sheet 10
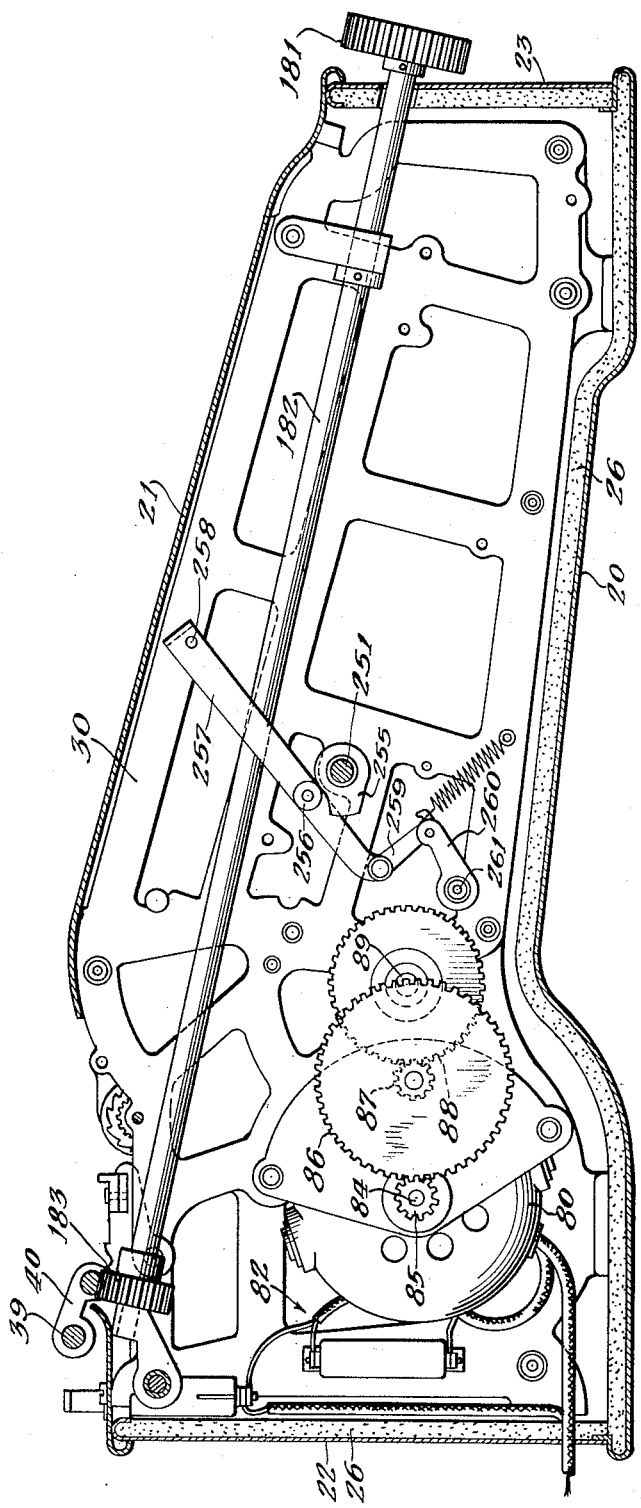

Aug. 21, 1956  J. A. V. TURCK  2,759,671
KEY-RESPONSIVE ADDING AND SUBTRACTING CALCULATING MACHINE
Filed Dec. 28, 1950  14 Sheets-Sheet 11

Inventor:
Joseph A. V. Turck
By:
Schroeder, Merriam,
Hofgren & Brady
Attorneys

Aug. 21, 1956  J. A. V. TURCK  2,759,671
KEY-RESPONSIVE ADDING AND SUBTRACTING CALCULATING MACHINE
Filed Dec. 28, 1950  14 Sheets-Sheet 12
FIG.15
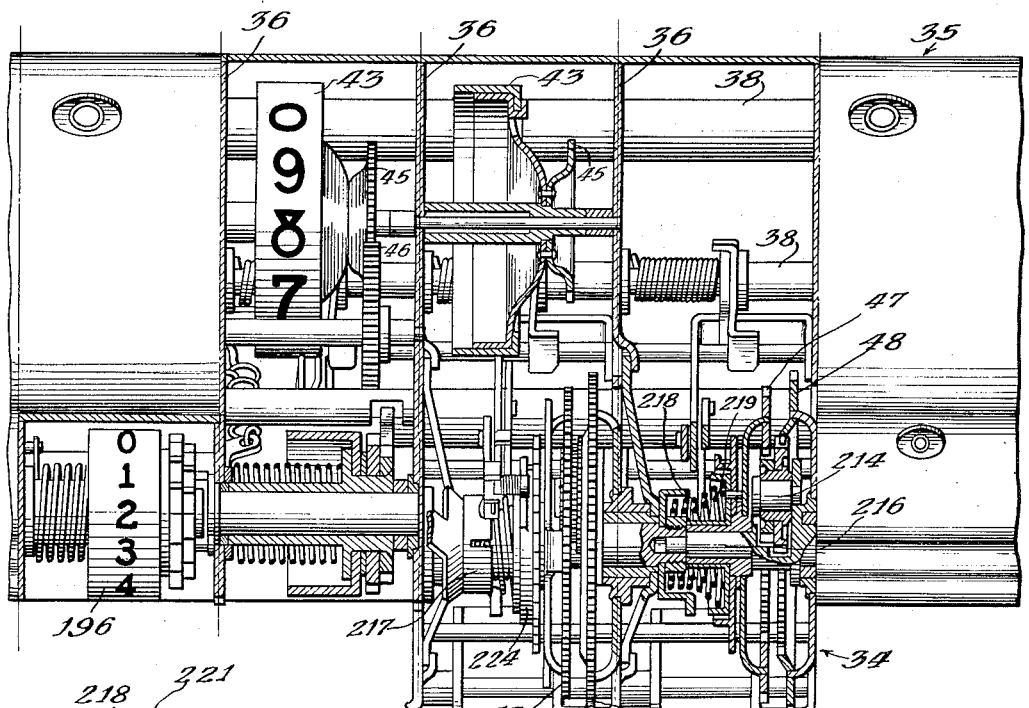
FIG.15A
FIG.16
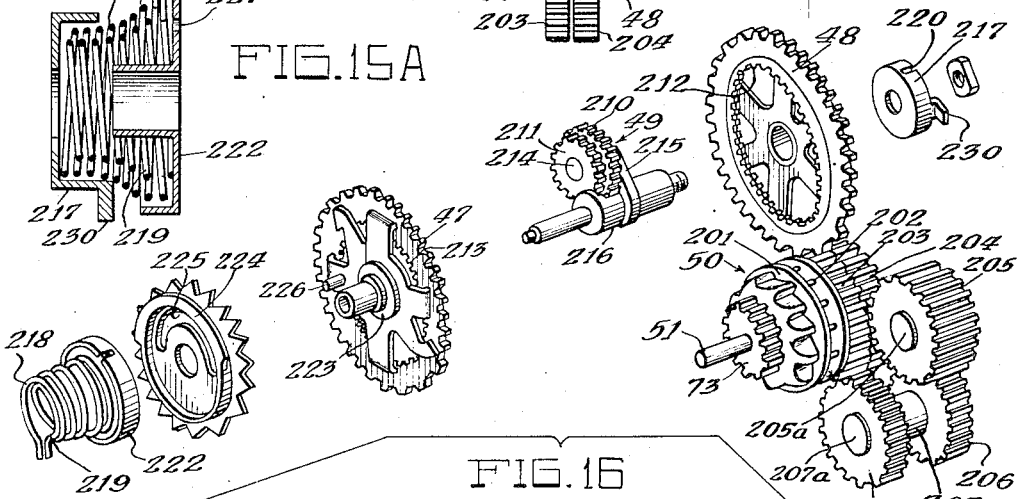
Inventor:
Joseph A. V. Turck
By Schroeder, Merriam,
Hofgren & Brady
Attorneys Aug. 21, 1956        J. A. V. TURCK        2,759,671
KEY-RESPONSIVE ADDING AND SUBTRACTING CALCULATING MACHINE
Filed Dec. 28, 1950                                      14 Sheets-Sheet 13

Inventor:
Joseph A. V. Turck
By Schroeder, Merriam,
Hofgren & Brady
Attorneys

Aug. 21, 1956 J. A. V. TURCK 2,759,671
KEY-RESPONSIVE ADDING AND SUBTRACTING CALCULATING MACHINE
Filed Dec. 28, 1950 14 Sheets-Sheet 14
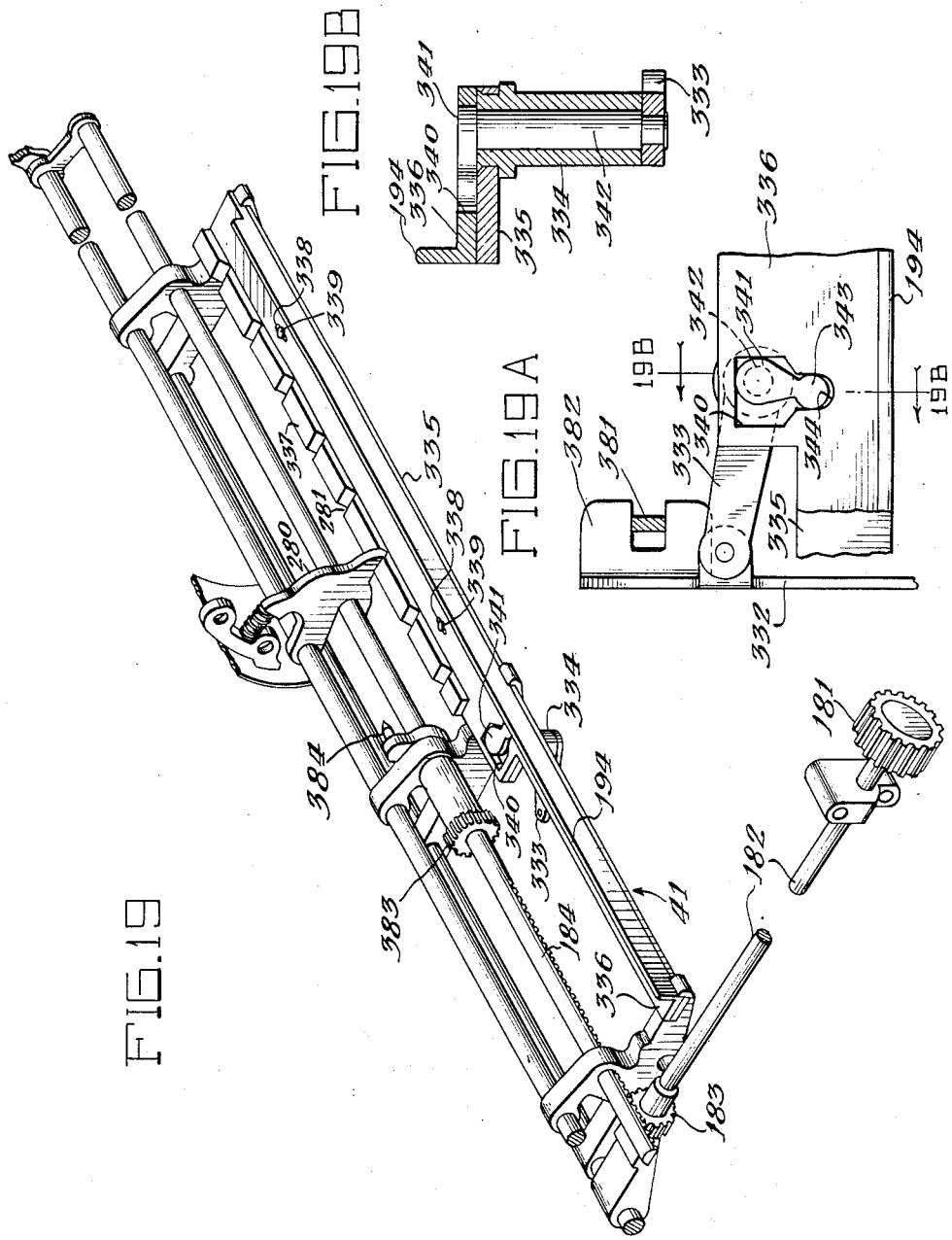
Inventor:
Joseph A. V. Turck
By Schroeder, Merriam,
Hofgren & Brady
Attorneys United States Patent Office 2,759,671
Patented Aug. 21, 1956

2,759,671
KEY-RESPONSIVE ADDING AND SUBTRACTING CALCULATING MACHINE

Joseph A. V. Turck, Miami Beach, Fla., assignor to Felt and Tarrant Manufacturing Company, a corporation of Illinois Application December 28, 1950, Serial No. 203,110

24 Claims. (Cl. 235—63)

This invention relates to calculating machines.

It is a principal object of this invention to produce a new and improved calculating machine.

A more specific object of the invention is the provision, in a key-responsive calculator in which the depression of keys adds into the register the amounts of the keys so depressed, of reverse actuating and carrying mechanism, and conditioning mechanism therefor, for cooperation with the keys so that key depression may subtract decrements of the amounts they represent without recourse to the complemental system.

Another object of the invention is the provision, in a key responsive calculating machine, of a dual automatic carrying mechanism for carrying increments of tens added to the higher order or decrements of tens subtracted from the higher order by the use of two motor type carrying springs, one wound in reverse of the other and so arranged that as one is being wound the other is being unwound so that when the machine is conditioned for carrying of a positive type, as in addition, one spring will furnish power by storage to be released and utilized to add one to a higher order and when the machine is conditioned for a negative type of calculation, such as in subtraction, the other spring will furnish power as it is wound to give off a reverse or negative carrying moment to the higher order to subtract one from a higher order.

A further object of the invention is the provision in a calculating machine of the type described, of a conditioning mechanism for unwinding the positive carrying springs and winding up the negative carrying springs for negative calculation and vice versa for changing calculation from negative to positive.

Another object of the invention is the provision in a reversible key responsive calculator for locking of the carrying cams to prevent their displacement during the reversing action of the carrying mechanism.

Another object of the invention is the provision in a calculator of the type described in the preceding paragraph of a detent mechanism to catch and lock the carrying escapement in whichever direction it may be rotating after release by the carrying cams.

Another object of the invention is to provide a calculator with means providing reverse action by the actuating mechanism to convey decrements to the register reading, as in subtraction, according to the denomination and marking of the keys depressed.

Another object of the invention is the provision in a reversely operable calculator of a locking mechanism to lock the zeroizing lever during negative setting of the machine, and means for clearing the locking mechanism during a setting of the machine for positive calculation.

Another object of the invention is the provision of a clearing mechanism which, if the machine has been conditioned for key-set operation, operates to condition the machine for key responsive action before the calculator can be set to perform negative calculation or vice versa.

A further object of the invention is to provide, in a calculator of the type described in the preceding paragraphs, means whereby when the machine is set for key-set operation, negative calculation and divisional calculation may take place with the same ease and the same action used in multiplication.

Another object of the invention is the provision, in a calculating machine of the type described, of the combination of mechanism for providing negative key-responsive calculation and a shiftable and reversible accumulator mechanism, whereby the speed with which short division may be accomplished is greatly increased without resort to the use of key-set multiple key operation, the keyboard being so arranged that the operator may operate three or four ordinal keys with the right hand and shift the carriage with the left hand without the necessity of shifting the operator's fingers on the keys as the division progresses.

A further object of the invention is the provision of a calculating machine which may be operated either as key responsive, as in addition, or key-set, as in multiplication, and including reversible actuating means adapted to impart forward or reverse movement to the accumulator mechanism, and in which the accumulator mechanism is capable of carrying tens to, or subtracting tens from, a higher order so that the subtraction and division calculations may be made without resort to the complemental system and generally in the same manner as addition and multiplication.

A further object of the invention is the provision of a calculating machine having a shiftable carriage and rows of ordinal keys, with the machine being operable either as key-responsive or key-set, the calculating machine being provided with a reversible actuating mechanism and positive and negative accumulator mechanism to be capable of employment in positive or negative calculation without resort to the complemental system.

Other and further objects of the invention will be apparent from the following description and drawings, in which:

Fig. 7 is a front to rear vertical section of the third section of conditioning mechanism taken from the right;

Fig. 8 is a cut away view of the cam shown in Fig. 7;

Fig. 9 is a sectional plan view taken of the cam mechanism of Fig. 7;

Fig. 10 is a right-hand elevation of the carriage with the end of the casing removed showing how the mechanism of Fig. 7 sets a lock on the zeroizing mechanism when the machine is set for negative calculation;

Fig. 11 is a front to rear vertical section of the fourth and fifth sections of the conditioning mechanism taken from the right;

Fig. 12 is a front to rear vertical view of the sixth section of the conditioning mechanism taken from the right;

Fig. 13 is a front to rear vertical view of the seventh section of the conditioning mechanism;

Fig. 15 is a front sectional elevation of the carriage showing sections with casing removed and a cross section taken through the gearing of the accumulator mechanism therein;

Fig. 15a is a vertical sectional view of the escapement mechanism;

Fig. 16 is a detached perspective view illustrating the accumulator mechanism in greater detail and the reversing means for actuating it;

Fig. 19 is a perspective view illustrating the carriage shifting mechanism and centering devices with changeable setting for positive or negative calculation;

Fig. 19a is a top plan view of the carriage shifting mechanism for shifting from positive to negative calculation; and Fig. 19b is a vertical section along line 19b—19b of Fig. 19a.

Figure 1:
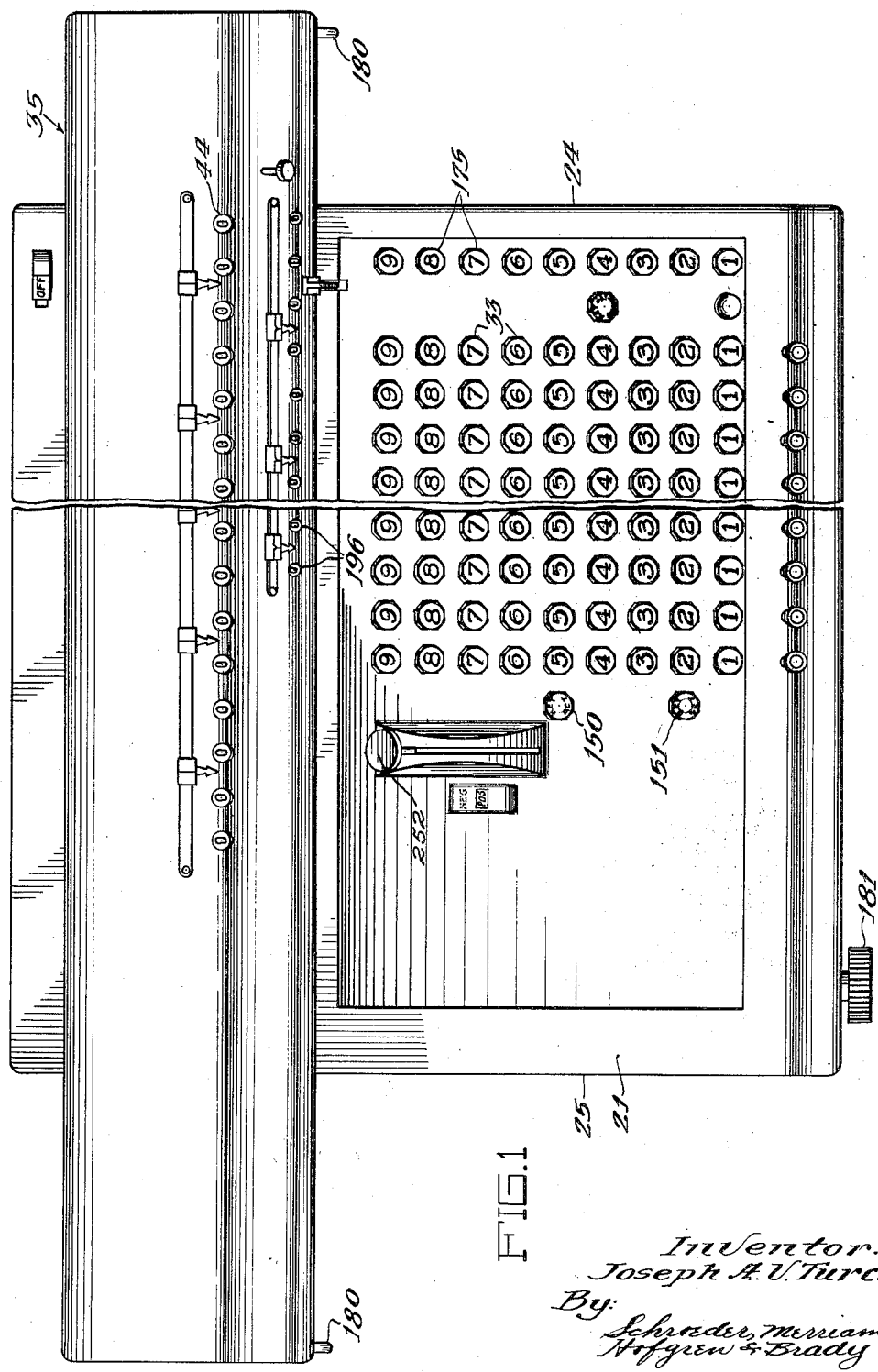
Fig. 1 is a plan view of a calculating machine embodying the present invention.
Figure 2:
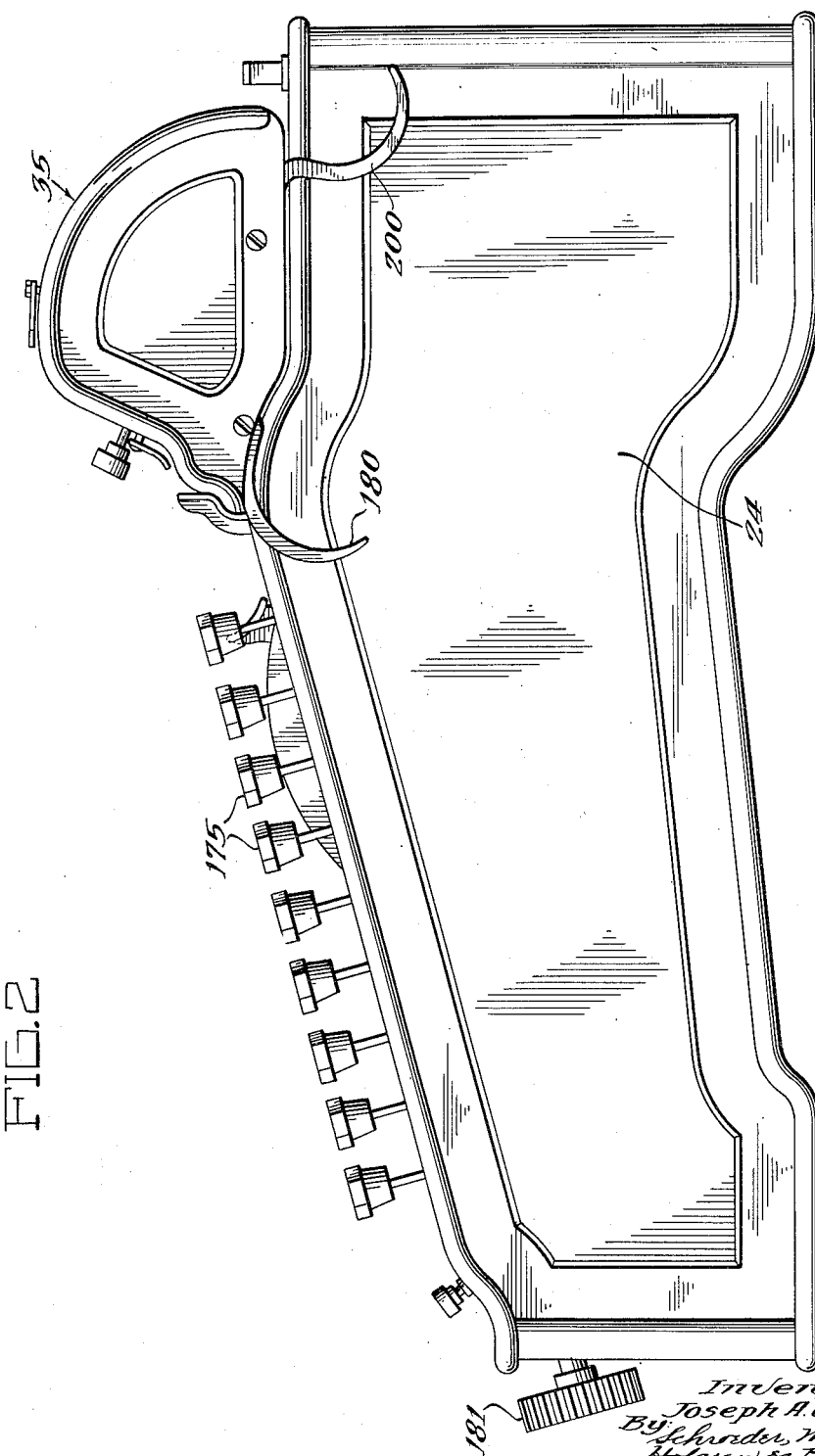
Fig. 2 is a side elevation taken from the right.

While this invention is susceptible of embodiment in many different forms, there is shown in the drawings and will herein be described in detail one specific embodiment, with the understanding that the present disclosure is to be considered as an exemplification of the principles of the invention and is not intended to limit the invention to the embodiment illustrated. The scope of the invention will be pointed out in the appended claims.

The calculating machine to be hereinafter described is constructed in many respects similar to and incorporates many of the improvements disclosed in my prior U. S. Patents 2,075,375, 2,241,102 and 2,315,464, which in turn were improvements on Patents 1,905,579, 1,926,826, 2,020,975 and 2,060,704. The calculating machine shown in the drawings comprises a case formed of a base plate 20, a top plate 21, a rear wall 22, a front wall 23, a right-hand side wall 24 and a left-hand side wall 25. The bottom and vertical walls may, if desired, be provided with sound deadening and cushioning packing 26. The operative parts are mounted in and carried by a frame which includes right- and left-hand supporting side plate 27 and 28 and intervening partitioning plates 30, all extending from front to back of the machine and held in fixed relation by tie rods 31 upon which are mounted spacing bushings or sleeves 32. The machine shown in the drawings is of ordinal character, and is provided with a plurality of actuating mechanisms arranged between the partitioning plates 30 as in said Patent 2,241,102. Each order of the machine is provided with a series of digital control keys 33, each series comprising nine keys bearing the numbers one to nine to be used for positive forms of calculation, such as addition and multiplication, as well as for negative forms of calculation, for example division and subtraction.

A plurality of accumulator units, in excess of the number of rows of ordinal keys, and generally indicated by reference character 34, is mounted in a shiftable carriage generally designated 35 which is shiftable transversely of the actuating units and into progressive cooperative relations therewith to vary the denominational relationship between the accumulator units and the actuating mechanisms. The carriage comprises generally a frame consisting of partitioning plates 36 secured in spaced relation by tie rods 37 and bushings 38. The carriage is pivoted upon a cross rod 39 mounted in upward extensions 40 of the side supporting plates 27 and 28 and rests upon a trackway generally designated 41.

The particular arrangement of the trackway as it relates to the improvements of this invention will be hereinafter described in further detail. The carriage is provided with a carriage housing 42 enclosing its rear, top and front ends, leaving the bottom open for engagement between the accumulator units and actuating mechanisms.

Referring now to Figs. 15 and 16, each accumulator unit includes a numeral wheel 43 adapted to be viewed through sight openings 44 in the carriage 35, and each wheel carries a pinion 45 in mesh with a pinion 46, which in turn cooperates with a gear 47 which forms a transmitting gear mechanism for advancing or reversing the numeral wheels by the desired additive or substractive movement in accordance with the degree of actuation of the ordinal column actuators as received by a ratchet gear mechanism generally designated 50 fixed upon a cross rod 51 carried in the main frame of the machine. The gear 47 is moved by a gear 48 through the medium of a differential cyclic gear generally designated 49 in a manner and for the purpose hereinafter set forth.

In the movement of the carriage and its contained accumulator units across the machine, the gears 48 are disengaged from the ratchet gear mechanism 50 at the beginning of a shifting movement and reengaged with other denominational gear mechanisms as may be desired in the calculation.

Figure 4:
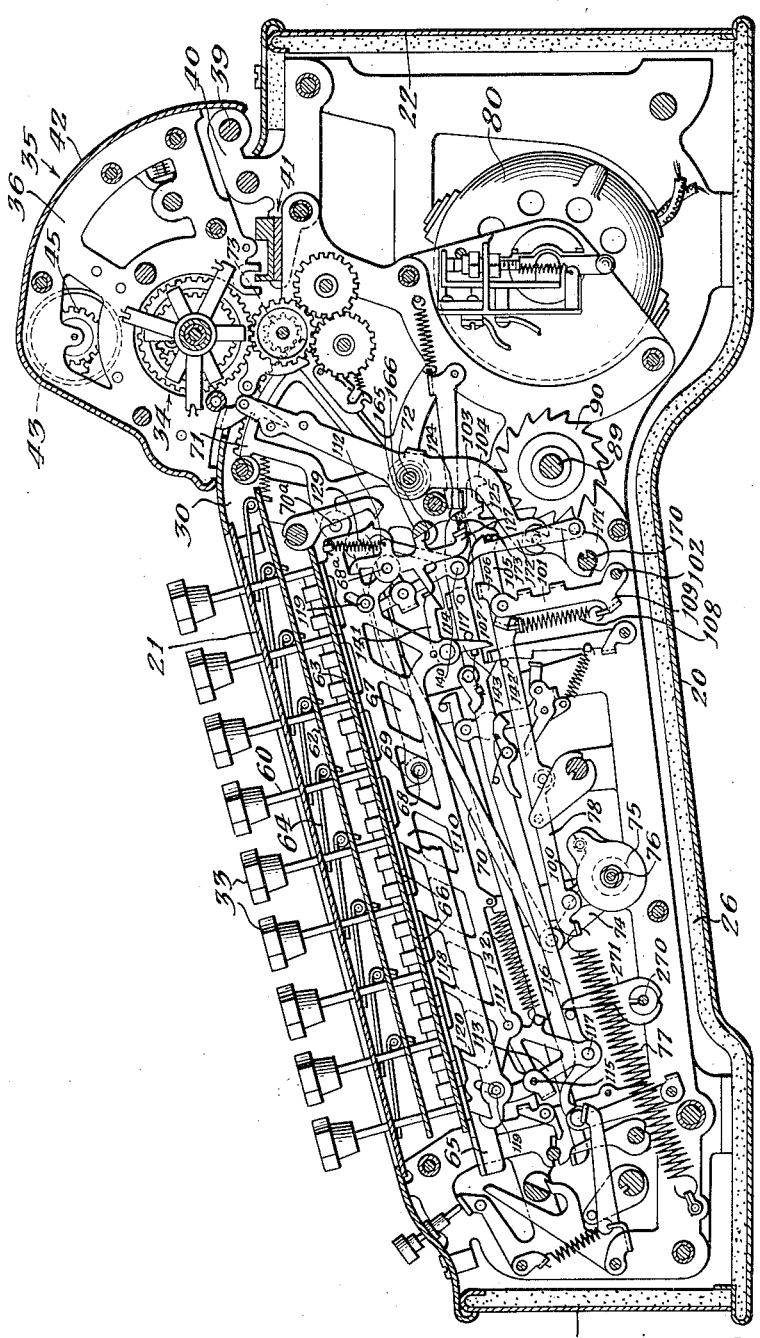
Fig. 4 is a front to rear vertical section taken at the right of the right hand digital order.

Referring now to Fig. 4, each key 33 is provided with a downwardly extending stem 60 arranged through plate 21 and through sub-plates 62 and 63. Springs 64 are provided to hold the keys in elevated position and to return them after each key stroke. Each order of the machine operated by the ordinal keys includes a digital control stop bar 65 arranged to extend beneath the lower end of the key stems when the keys are in elevated position and to be pulled rearwardly of the machine in an amount determined by the value of the particular key of the order depressed. The stop bar 65 is provided with differentially spaced lugs 66 adapted to engage the depressed key stem, the spacing being such that the stop bar 65 has an increasing unit movement from the "one" key in the front to the "nine" key in the rear of the associated order of keys.

As seen in Fig. 4, a link 67 has one end pivotally connected at 68 with a downwardly extending arm 69 on the stop bar 65 with the other end of the link 67 being pivotally connected at 68a to a link 70. The link 70 is pivotally connected at 70a to a rack sector 71 pivoted on a cross rod 72 and provided with teeth continually in engagement with a pinion 73 forming a part of the ratchet gear mechanism 50. The link 70 is pivotally connected at its other or front end with an arm 74 of a friction device 75 carried on a shaft 76 extending across the machine and having a bearing in the partitioning plates 30. A spring 77 is connected to a link 78 and to the frame of the machine. Upon depression of a key, depression of the sector is accomplished by a continuously moving power mechanism to which it is connected, the result being that the associated rack sector 71 is swung down the desired amount with a consequent extension of the spring 77 and the storing in it of power to accomplish the upward movement of the sector upon disconnection of the actuating unit from the power means.

Figure 3:
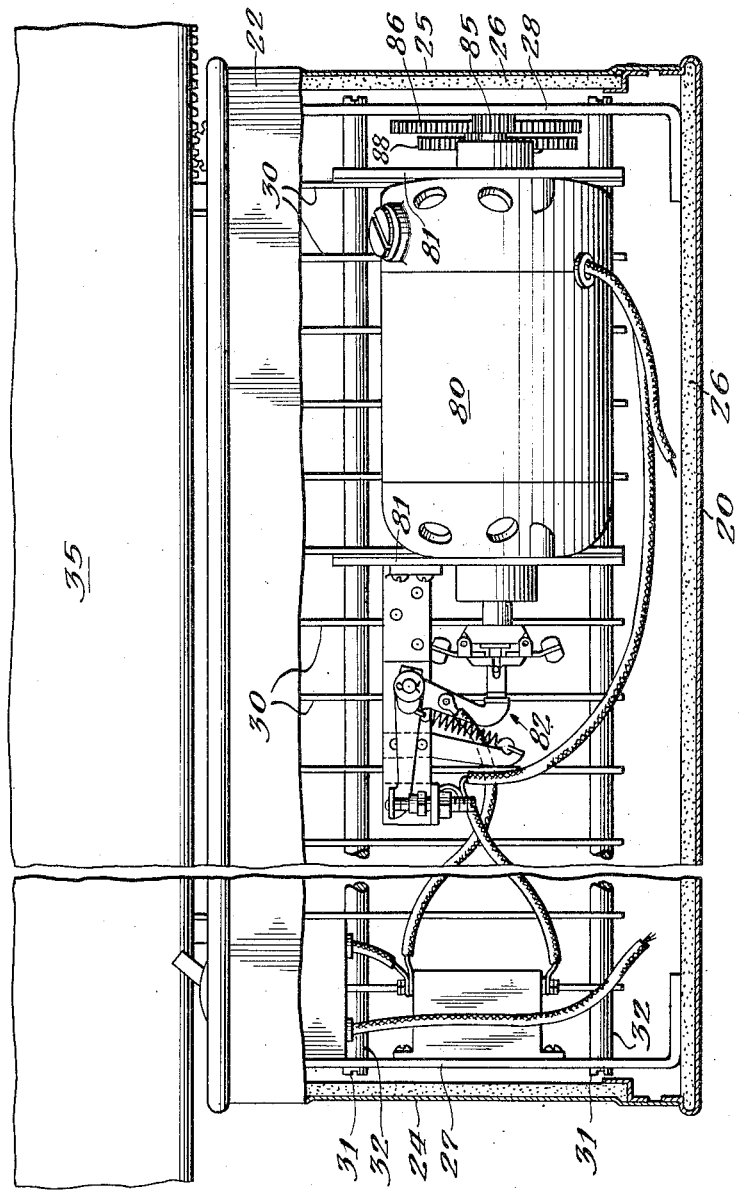
Fig. 3 is a rear elevation with rear wall of case removed showing assembly of motor.

Referring to Figs. 3 and 13, the power means includes an electric motor 80 secured to and carried by supporting plates 81 fixed in the frame at the rear of the machine. Current is supplied to the motor through suitable electric wiring and controls indicated generally at 82. The motor shaft 84 carries a pinion 85 in mesh with an idler gear 86, which in turn carries a pinion 87 in mesh with a gear 88 upon a drive shaft 89 extending across the machine. This shaft 89 is provided with a toothed wheel 90 for each order of the machine.

From an inspection of Fig. 4, it will be noted that parts of the actuating mechanism are similar, in many respects, to that shown in my said Patent No. 2,241,102. Thus the friction device 75 of each actuating mechanism is provided with an arm 100 pivotally connected to the link 78, which in turn is pivoted to an upright guard arm 101 pivotally mounted upon a cross pin or rod 102 extending across the frame. An arm 103 having a hook 104 at its free end and a spring lifted lever 105 are also pivoted to the upper end of the guard arm 101. The spring lever 105 is arranged within or beneath a bent-over portion 106 of the hook arm 103 and has a lip 107 extending over toward the hook arm 103 at the rear end of the spring lever 105. A spring is wound about the pivot at the upper end of the guard arm 101 and normally holds the portion 106 of the hook arm 103 in engagement with the spring arm 105. A spring 108 is secured at 109 to the lower portion of the guard arm 101 and to the front end of the spring lever 105 and tends to lift the free end of the spring lever 105 upwardly to sustain the hook 104 of the arm 103 normally out of contact with the toothed wheel 90.

In accomplishing a calculating operation, depression of one of the ordinal keys causes the hook arm 103 to engage the toothed wheel 90 and move a full stroke rearward. The hook arm is provided with downwardly extending lugs adapted to be engaged by teeth of the wheel following the tooth engaged by the hook 104 as the hook is drawn rearward to lift or cam the hook upwardly and positively disconnect the hook from the engaged tooth at the end of a predetermined movement whereupon the spring 108 returns the hook arm 103 to its normal level. The power strokes thus induced are all of a predetermined travel which is the same for all digital values. The sector 71 is moved downwardly upon the power stroke only the amount permitted by the particular digital key depressed, downward movement of the sector continuing until halted by the engagement of the stop bar 65 with the key stem of the key depressed. The friction device 75 permits continuation of the movement of the link 78 after the halting of its associated sector gear. The power stroke extends the spring 77 and stores up in it the power needed to accomplish the actuation of the accumulator upon the return stroke of the sector which occurs when the hook 104 is disconnected from the toothed wheel.

A parallel motion device is provided for each of the ordinal key operated actuating units and includes an equalizing key bar 110 (Fig. 4) pivoted at 111 and 112 respectively to levers 113 and 114, which in turn are pivoted at 115 on rods extending through the partitioning plates of the frame. The parallel motion device also includes a bottom bar or link 116 pivoted at 117 to the lower ends of the levers 113 and 114. A key locking bar 118 is pivoted at each end at 119 to the upper ends of the levers 113 and 114 and is provided with locking fingers 120 adapted to enter suitably formed openings in the key stems as they are depressed. Thus a key stem, in moving down upon depression of the key, engages the upper surface of the key bar 110. Depression of this bar by the key stem in its parallel motion swings the levers 113 and 114 in a clockwise direction and causes the adjacently arranged locking finger 120 to enter into the presented opening in the stem of the key depressed.

The spring wound around the upper end of the guard member 101 and the spring 108 normally holds the hook arm 103 in an elevated position and clear of its toothed wheel as previously pointed out. The hook arm has a laterally extending shoulder 124 which is normally disposed a short distance above an appropriately arranged lip 125 provided on the rear end of the link 116 and is adapted to engage the upper side of lip 125 upon depression of the hook arm 103. The key bar 110 carries a downwardly extending dog 127 which is provided at its lower end with a lug arranged above and positioned to engage the lug 107 on the spring lever 105, this dog being normally held in rearward position by a spring 129 tending to swing the dog in a counter-clockwise direction as seen in Fig. 4.

Upon depression of a key the dog 127 depresses the spring lever 105, the hook arm 103 being held up at this instant by engagement of its lug 124 on top of the lug 125 at the rear end of link 116. The depression of the key moves down its equalizing bar 110 and also moves the link 116 towards the front of the machine. The downward movement of the spring lifted lever 105 provides the proper tensioning of the spring at the top of the guard arm so that when the hook arm 103 drops the hook will make full engagement with the presented tooth of the wheel 90 and as soon as the lip 125 on the link 116 moves from under the lip 124 on the hook arm the hook drops down into engagement with the toothed wheel. A spring 132 is connected to the key bar and to the lever 113 and normally tends to move the parts of the parallel motion device to raise the key bar when a key is released after depression.

The machine shown in the drawings is provided with means for locking down a depressed key and also the key bar 110 until the rearward movement of the link 78 is nearly completed. A bent lug 140 is provided on the lower bar 116 of the parallel motion device and a hook latch 141 is pivotally connected to the key bar 110 in position to hook over the bent lug 140 before the key bar reaches its lowest position on the depression of a key. A pin 142 is provided on the link 78 in position to engage a downwardly extending finger 143 formed integral with the hook latch 141, striking of the pin 142 against the finger 143 unhooking the latch and permitting the parts to rise again to normal position.

As has been earlier stated, the machine of this invention like that of said Patent 2,241,102 is adapted to operation either as a power driven key-responsive calculator or as a power driven key-set calculator for automatic actuation.

Figure 5:
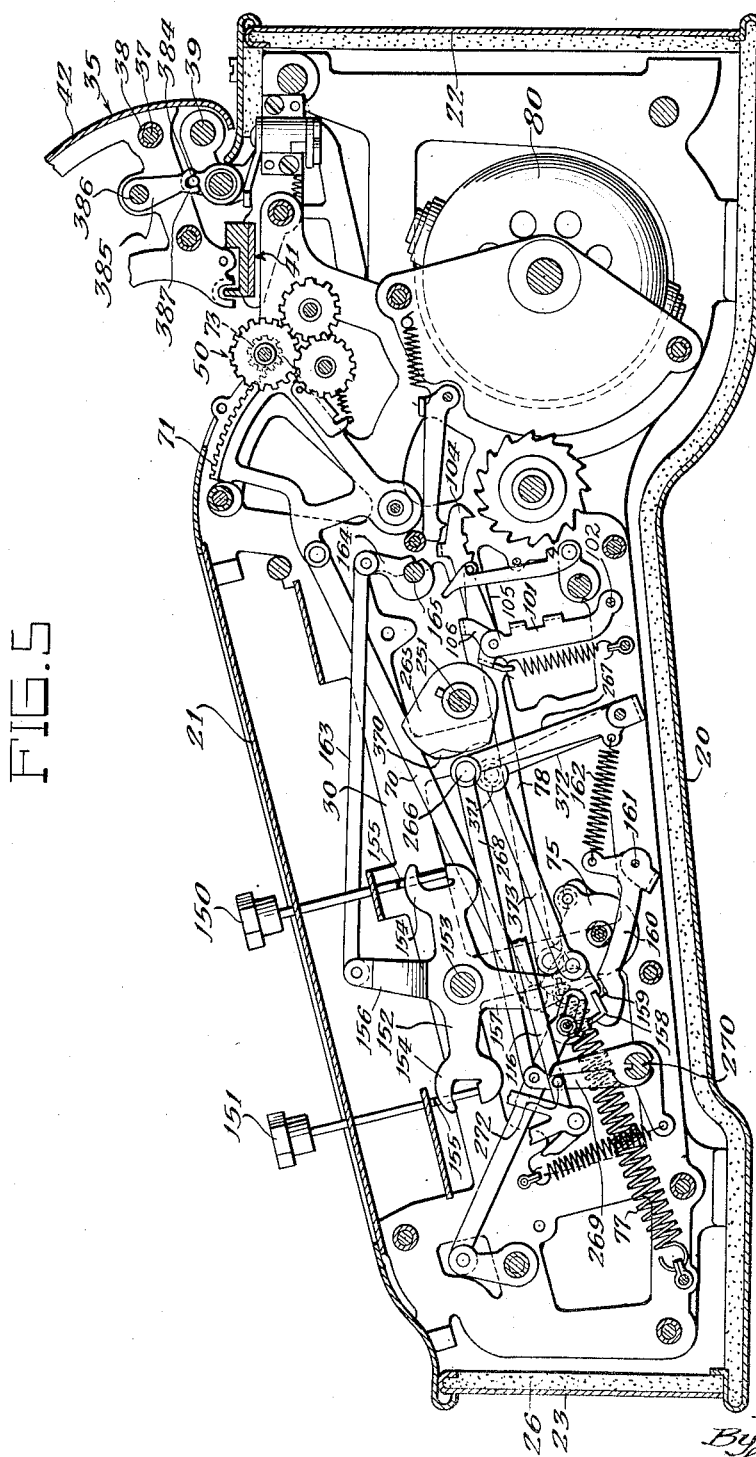
Fig. 5 is a front to rear vertical section taken from the right of the first section of the conditioning mechanism located next to the leftmost digital orders, and showing an extension of a transordinal rock shaft into the next right-hand order to illustrate its connection with a broken away part of that order.

Referring now to Figs. 1 and 5, it will be noted that at the left of the series or bank of ordinal keys are two keys indicated respectively by reference characters 150 and 151, the former being labelled "Key Act" and the latter "Key Set." These keys are adapted for alternate depression, the depression of one key raising the other.

A walking beam lever 152 is pivoted on a cross rod 153 just below the keys 150 and 151, and this lever has an end 154 located beneath each key, with each end having a finger adapted to extend into an aperture in the key stem to maintain the engagement with the V bottom of the walking beam lever 152. The arm 156 of this lever is pivotally connected with a link 163 extending toward the back of the machine, and this link is in turn pivotally connected with an arm 164 fixed upon a cross shaft 165 having suitable bearings in the frame and extending past the various orders of actuating mechanisms. This shaft is arranged closely adjacent the dogs 127 which, it will be remembered, serve to depress the spring lever 105 and through them brings the hook arm 103 into engagement with the toothed power wheels 90. The shaft 165 is milled (see Fig. 4) adjacent each dog 127. An arm or finger 166 is provided on each of the dogs 127 adapted to extend into the milled portion of the shaft when the parts are arranged for key-responsive action. When, however, the key 151 is pressed the shaft 165 is rocked in a counterclockwise direction, and all of the dogs 127 of the several key responsive orders are swung toward the front of the machine moving their lugs out of registration with the lugs 107 of the spring lever 105. This movement of the dogs also lifts the hook latches 141. Depression of the keys with the parts thus arranged does not cause engagement of any of the hooks with their companion toothed power wheels.

When the machine is set for operation as just described, means are provided for holding the keys and parallel motion device in the positions they assume upon key depression. The mechanism is set forth in Patent 2,241,-102, and hence will not be further described herein.

It will be noted that the forward movement of the dogs 127 out of operative position with the spring levers 105 results in no depression of these levers when a key is positioned down and the mechanism locked in the key-set position. The spring lever 105 and the hook arm 103 of the order involved are held up by the companion spring 108 until actuated by supplemental mechanism adapted to produce repeated actuations to accomplish multiplication (and as will become apparent later to accomplish division as well).

The means for accomplishing repeated actuation is similar to that in my last mentioned previous patent and includes a shaft 170 having a bearing in the frame and extending across all the several orders of key-responsive actuating mechanisms in the right of the machine. The shaft 170 is provided with an arm 171 fixed to it and arranged adjacent each such order. A latch 172 is pivoted on each arm and extends up above a pin 173 fixed on the companion spring lever 105. Each latch 172 is provided with a hook at its upper end adapted to engage over the pin 173 and depress the spring lever 105 each time the shaft 170 is rocked in a clockwise direction as seen in Fig. 4.

A column of keys 175 (see Fig. 1) is arranged at the right-hand side of the keyboard and adapted to act as multiplier keys. Depression of any one of the multiplier keys results in the connection of the hook arm 103 with the toothed power wheels 99 for the number of repeated additive (or subtractive) operations indicated by the key depressed. The arrangement is similar to that shown in my said Patent 2,241,102. By depressing the key 151 the calculator is conditioned for key-set operation whereupon as the ordinal keys are depressed they are retained in depressed position. With a group of ordinal keys depressed, the operator need merely depress one of the keys 175 to produce repeated additions of the amounts represented by the depressed keys. Thus if the "4" key is depressed the amount represented by the depressed ordinal keys is added four times. By this arrangement, rapid multiplication may take place inasmuch as the carriage may be shifted between each group of repeated actuations to perform multiplying operations. As will hereinafter be evident, the keys 175 perform an additional function in the calculator of this invention in that they may be used to perform repeated subtractions when the calculator is conditioned for negative calculation, and thus rapid short division may be achieved as well as rapid short multiplication.

The carriage in which the accumulator mechanisms are mounted, as has been explained, is denominationally shiftable through a lifting and sliding motion, these motions being accomplished as described in my Patent 2,-241,102. The lifting of the carriage detrains the gears 48 from the ratchet gear mechanisms 50 in the initial movement of the carriage. When the carriage is lowered, the gears 48 are reentrained with the ratchet mechanisms. The carriage may be lifted directly by pulling on finger pieces 180 arranged at each end of the carriage or by turning a knob 181 arranged at the front of the calculator and mounted upon a shaft 182 extending to the back and carrying a gear 183 (Fig. 13) in mesh with a toothed bar 184 (Fig. 19) in the carriage mechanism.

The operation of lifting the carriage disengages the gears of the accumulator mechanism from the ratchet mechanism 50 and this would, unless prevented, release the tension on the carrying springs provided in the accumulator mechanism. In order to prevent the carrying springs from unwinding and losing their tension there is provided in each order of the accumulator mechanism a locking lever 190 (Fig. 18) for locking the gears of the accumulator mechanism against movement whenever the respective gears 48 are disengaged from the actuating mechanisms. The lock levers 190 are pivoted at their lower ends on a rod 191 which passes through the several plates of the carriage frame and the upper ends of the lock levers are provided with detents 192 adapted to move into engagement with the external teeth of the gears 48 when the lock levers are released with lifting of the carriage. The lock levers 190 are provided with horizontal arms 193 which engage a ledge 194 provided on the track 41 to throw the detents out of engagement with the gears 48 when the carriage frame is in its lowered position. A lug 196 fixed to the lock levers 190 operates to unlock the gears 48 when the zero stop lever is operated and is rocked into zeroizing position by the transordinal rock shaft 191.

A plurality of counterwheels 196 (Fig. 1) are mounted in the carriage and are operated in multiplying and dividing as set forth in my said Patent 2,241,102.

Zeroizing of the accumulator mechanism is performed in a manner similar to that described in the patent just mentioned and is accomplished by pulling forward the zeroizing lever 200. In moving this lever forward the carriage is lifted and the carrying springs released so that the carriage so lifted may be moved to the desired starting point for the next calculation, the operation of the lever serving to prevent the detents 192 from engaging the gears 47 to permit the gears to return the register wheels to zero reading.

For the most part, the component parts of the calculating machine of this invention, herein just described, are to be found in my said prior Patents 1,926,826 and 2,241,-102. The calculator of this invention, however, is provided with means not only for moving the register wheels of the accumulating mechanism forward, as in positive forms of calculation, but also backwards as in negative forms of calculation so that negative calculation may be performed directly upon the machine without resort to the complemental system, the keys bearing a single marking and being operated in accordance with their markings in both negative and positive calculations.

Figure 14:
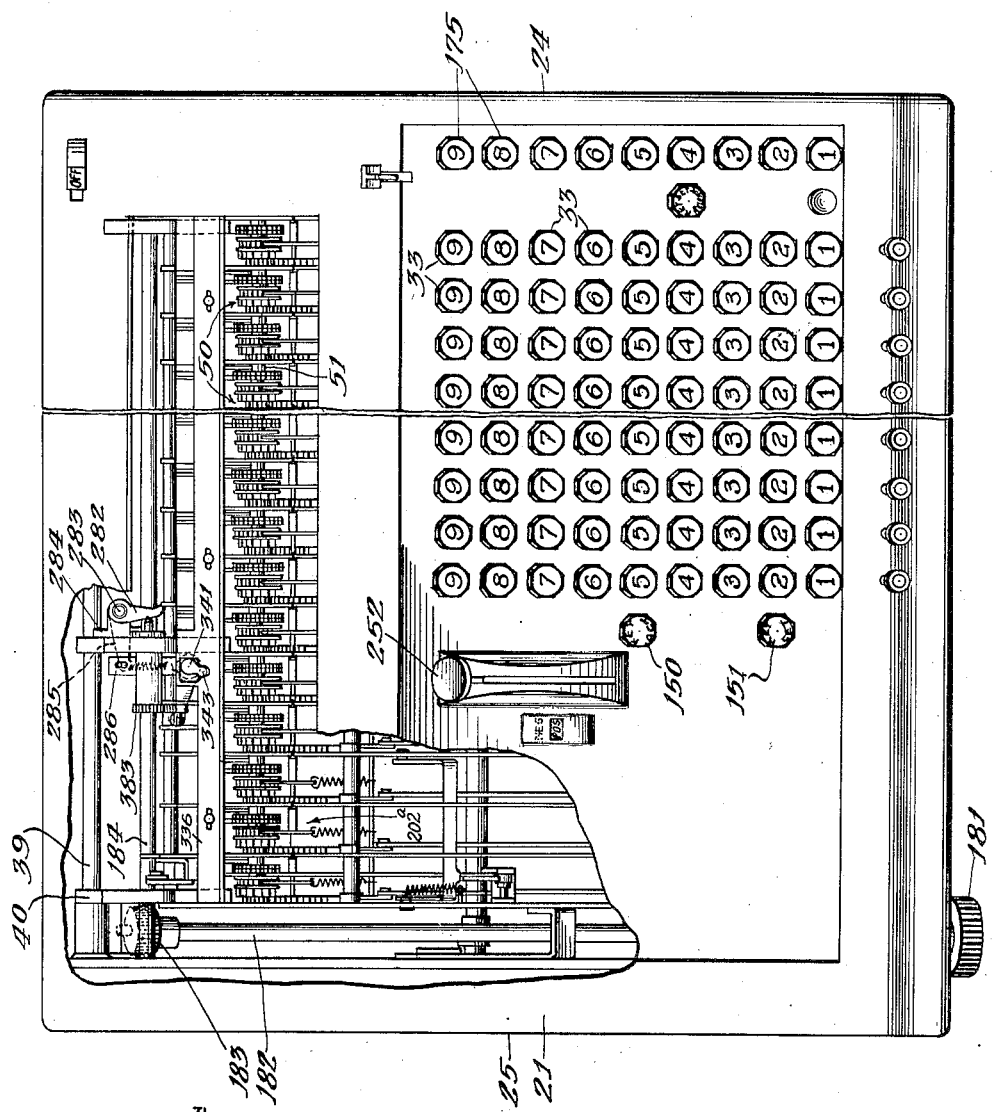
Fig. 14 is a plan view of the machine with the carriage removed and a section of the casing removed to show sections four, five, six and seven of the conditioning mechanism.

Referring now to Figs. 15 to 18 inclusive, the pinion gear 73, as previously explained, is secured to the ratchet member 50 which includes an internal ratchet mechanism connected to one side 201 of a lantern wheel 202 to which wheel is affixed a gear 203 which, in the previous patents referred to, served as the only means of transmitting motion to the gear 48 of the accumulator mechanism. Cooperating with the lantern wheel are the usual stop devices for preventing overrunning of the wheel and for preventing reverse rotation thereof including the spring actuated backstops, indicated at 202a (Fig. 14), all as more fully described in my previously mentioned Patent No. 1,926,826.

The motion transmitted from the gear 203 was in the machines referred to and is in the present machine a positive actuation. Rotatably mounted on the hub of the lantern wheel 202 and at the right of the gear 203 is a gear 204 of the same pitch, number of teeth and width as the gear 203. The gear 204 is driven in the opposite direction as the gear 203 by a gear 205 mounted on a stud, the flanged head of which is indicated as 205a, and meshes with another gear 206 connected by a hub 207 with a similar gear 208 in mesh with the gear 203. The two gears 206 and 208 revolve as one, on a flanged stud made fast in the frameplates in each order, with the stud having a flanged head indicated as 207a. The gears 205—208 form a motion transmitting and reversing mechanism so that each time the gear 203 is rotated in one direction the gear 204 is rotated in the opposite direction. Thus it may be understood that when increments of motion are conveyed to the gears 203 like increments of motion in the reverse direction are conveyed to the gears 204. To impart reverse motion to each gear 48 of the accumulator mechanism, each gear is shiftable in a direction parallel to its axis of rotation so that it may engage the teeth of either the gear 203 or the gear 204 and thus be driven in a forward or reverse direction at the will of the operator of the machine.

The carrying mechanism and escapement mechanism of the previous patents referred to are usable only for adding movement and are not reversible to take away tens as well as to carry tens to or from the next higher denominational order. To accomplish such reversible operation, the carrying mechanism has been modified to provide carrying mechanism operable in forward and reverse direction, together with escapement mechanism which is operable both when the accumulator mechanism is being driven forward in positive forms of calculations and reversely in negative forms of calculation. The differential cyclic gear arrangement 49 is provided with two gears 210 and 211, the teeth of the gear 210 meshing with the internal teeth 212 provided on the gear 48 while the teeth of the gear 211 mesh with internal teeth 213 provided on the gear 47, so that a carry may take place through the differential action of said gears even though the gears 48 are rotating. The gears 210 and 211 are fixed together and rotatably mounted upon a shaft 214 fixed to an arm 215 extending from and fixed to a shaft 216. During rotation of the gear 48 by either of the gears 203 or 204, the gear 210, and hence the gear 211, is also rotated, thereby to rotate gear 47. The cyclic gear arrangement, however, permits a carrying action to take place even during rotation of the gears 48 by the actuating mechanism, such carrying action being accomplished through rotation of the shaft 216 by means of carrying springs. Inasmuch as the cyclic gear arrangement is capable of producing a carry either forwardly or reversely, suitable means are provided for rotating the shaft 216 in either direction so as to produce a carry of tens to or to take away tens from the next higher order of the machine.

Made fast to the shaft 216 is a cupped carrying escapement 217 which is driven by one or the other of two motor carrying springs 218, 219, wound in opposite direction with their radially bent ends protruding through a slot 220 in the cup while similar bent ends at the other ends of the two motor carrying springs are attached to a like slot 221 in a cup disc 222 having a hub which fits loosely over the hub of the gear 47. Between the said cup disc and riding upon a shoulder 223 of the hub of the gear 47 is a carrying cam 224 having an annular semi-circular slot 225 through which a pin 226 fixed in the web of the gear 47 passes. The pin passes through the slot and into a hole 227 in the cup disc 222 making a complete hookup of the two oppositely wound carrying springs with the gear 47 so that if the cup escapement 217 be held against rotation either one or the other of the springs becomes tensioned depending upon the direction of rotation of gear 47.

Figure 17:
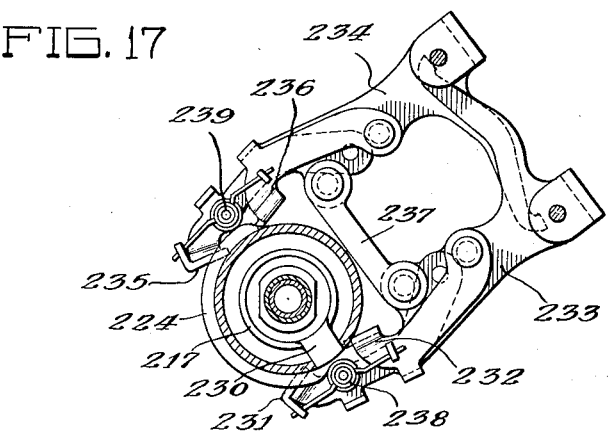
Fig. 17 is an enlarged view of the carry escapement devices of the accumulator mechanism.

Referring now to Fig. 17, there is shown the escapement device for holding one end of either of the two carrying springs 218 and 219 so as to permit power to be stored therein as the other end is being wound by the gear 47. An escapement stop lug 230 is provided on the cup 217 and is adapted to be held against rotation between detents 231 and 232 pivotally mounted upon a lever arm 233. A similar lever arm 234 carries another pair of detents 235 and 236 and the two lever arms are linked together by a link 237 so that as one lever arm is moved to release the detents, for example the detents 231 and 232, the opposite pair of detents 235 and 236 are moved into engaging position to catch and hold the stop lug 230 of the escapements 217 as it swings around. It will be noted that at the end of each carrying detent arm there is provided a dolly roll, thus the arm 233 carries the dolly roll 238 while arm 234 carries the roll 239. The dolly rolls bear against the carrying cam 224 and so provide means by which said cam controls the carry in either positive or negative calculation. Assuming that both carrying springs are tensioned about one-half turn in opposite directions before assembly to provide each spring with excess power even at zero for a complete carry, and that the gear 47 is given a one-half revolution in a clockwise direction as seen in Fig. 16 (clockwise movement would be a positive or adding movement) the pin 226 will contact the end of the slot 225 and be positioned to rotate the cam. When the cam moves one of the dolly rolls 238—239 outwardly it releases the carrying escapement lug 230 from whichever pair of detents are holding it and thereby causes a carry of the tens to take place the same as in previous machines. When the carriage has been shifted so that the reverse actuating gear 204 is in mesh with the gear 48, the direction of movement of the gear 47 would be the opposite or in an anti-clockwise direction causing the numeral wheel to revolve backward and a carry to take place in reverse revolving the numeral wheel in the next higher order backward one step.

There is rarely, if ever, an occasion to perform negative calculations, such as subtraction or division, unless there is a sum in the register to divide or to subtract from. Therefore, while shifting the direction of carrying by winding up one set of carrying springs and unwinding the other set of carrying springs, the location of all of the carrying cams must not be disturbed and the register reading must remain the same as it was before the reverse setting takes place. It is clear, however, that the winding up of one spring serves to unwind the oppositely wound carrying spring except for the initial one-half turn tension applied to each spring. In other words, if the machine is set for positive actuation and after accumulating a total is reset to subtract an amount from the register, it is clear that the carrying cams in all orders must be locked and then all the gears 47 made to perform a one-half revolution in the opposite direction. This one-half revolution of the gears 47 serves to unwind all the positive carrying springs and wind up all the negative carrying springs. This action of the gears 47 also causes all of the numeral wheels to revolve three hundred sixty degrees in one direction or the other, inasmuch as there are twenty teeth on the gear 47 and ten on the gears 45 secured to the register wheels. This brings the same reading into registering position in all orders. Further, the one-half revolution of the gear 47 moves the pin 226 from one end of the slot 225 to the other end of the slot ready to pick up the cams and move them with it under whichever form of operation the machine has been set for.

From the foregoing description, it will be clear that there must be provided means for rotating each of the gears 47 in all orders of the accumulator mechanisms a one-half turn forwardly or reversely as the machine is shifted from negative to positive operation or vice versa. In the particular embodiment shown, as there are fourteen accumulative orders in the carriage (plus an overflow register wheel which does not require actuation) and there are but eight orders of key-operated actuating mechanisms, six other orders of actuating mechanism must be supplied to rotate the fourteen gears 47 in the machine the one half revolution above referred to.

One of the six additional orders, which are positioned to the left of the eight ordinal key-operated orders of key-operated mechanism, is illustrated in Fig. 11. The six additional orders contain many of the parts provided in each of the ordinal key-operated orders and a further description of the parts is believed unnecessary. Parts of the new orders corresponding to similar parts of the key-operated order already described have been given similar reference numerals to the parts in the key-operated orders previously described. Obviously, no ordinal keys are provided for any of the six additional orders nor are the other parts which connect the keys to the sector gear. Each of the orders does include a sector gear 71 connected by a link 70 and an arm 74 to the friction device 75 which in turn is connected by link 78 to the hook arm 104 which is adapted to contact one of the constantly rotating toothed wheels 90.

Figure 6:
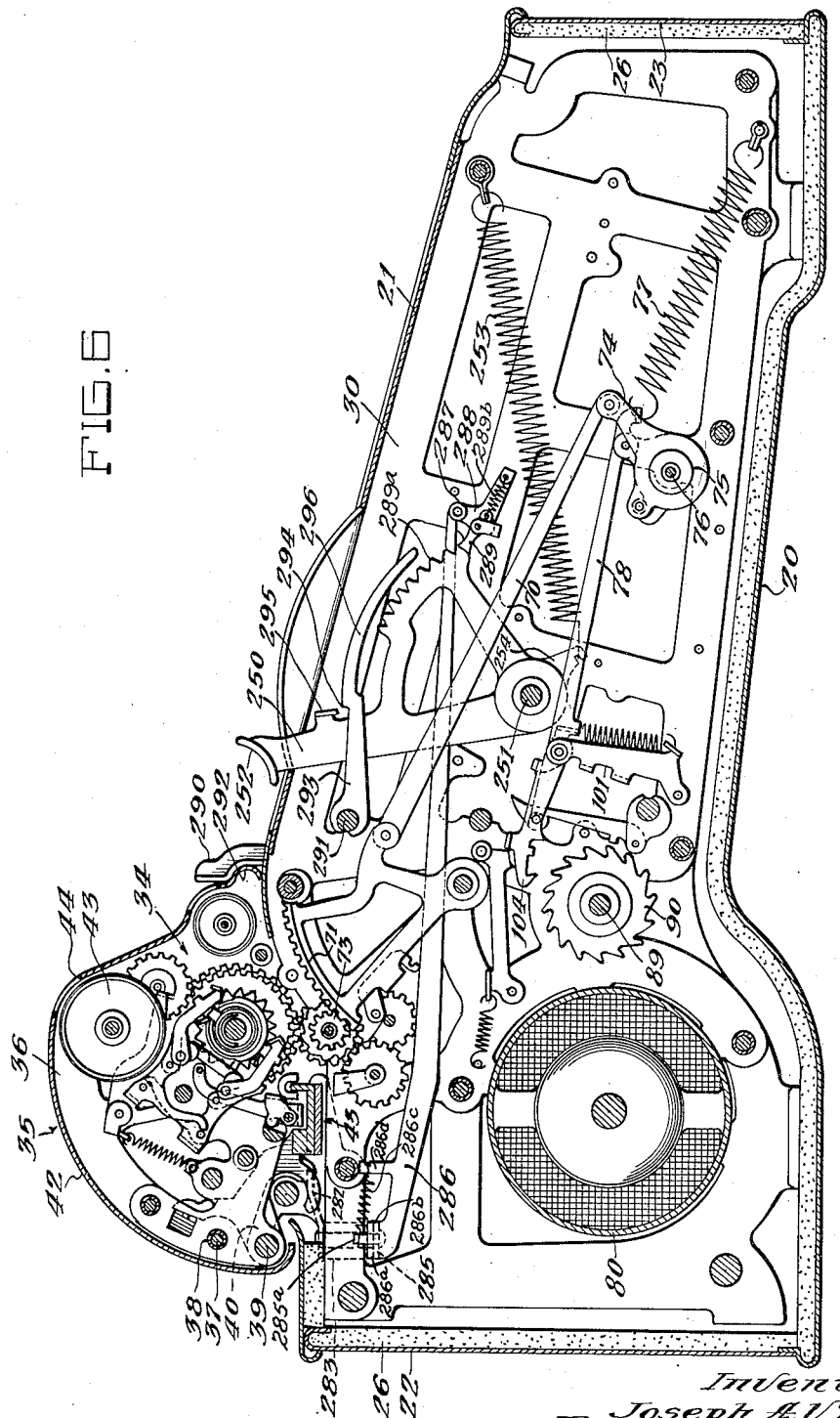
Fig. 6 is a front to rear vertical section taken from the left showing the second section of conditioning mechanism.

A lever 250 (see Fig. 6) is provided to condition the machine for positive or negative calculation, the lever being fixed to a transordinal shaft 251 and provided with a finger operated portion 252 extending above the top plates of the machine, and hence readily accessible to an operator. A spring 253 is connected to an arm 254 of the conditioning lever 250 and serves to return the lever to the rearward position shown in Fig. 6 after it has been operated. As the conditioning lever 250 is swung forwardly the transordinal shaft 251 is rocked clockwise as shown in Figs. 6 and 13 or anti-clockwise as shown in Fig. 12.

Referring to Fig. 13, it will be noted that the shaft 251 is provided with a cam 255 fixed thereto adapted to coact with a dolly roll 256 fixed upon a lever 257 having its upper end pivoted to the frame plate 30 at 258 and connected at its lower end with a first arm 259 pivotally connected to a second arm 260 fixed upon a transordinal shaft 261. As the shaft 251 is rotated clockwise, the lower end of the lever 257 is swung upwardly rocking the two arms 259 and 260 to rotate the transordinal shaft 261 in a counterclockwise direction as shown in Fig. 13 or in clockwise direction as shown in Fig. 12. Referring to the latter figure, it will be noted that the shaft 261 is pivotally connected to the arms 171 in each order, each of which is pivotally connected to a latch 172 and operates in the same manner as the arms 171 shown in the ordinal key-operative orders (see Fig. 4) to draw the hook 104 downwardly until it engages with the teeth of the wheel 90. The previously described lugs associated with each of the hook arms 103 are so proportioned as to permit ten units of adding movement of the sectors 71 before disengaging the hook 104 when those sectors are permitted to travel their full movement. Such movement of the sector gears rotates each of the gears 48 through 180°. Thus the register wheels are rotated 360°. Full movement of the sectors 71 in each of the six additional orders always occurs inasmuch as no key stop bar mechanism is provided in those orders.

The manner in which the adding movement is imparted to the accumulator mechanisms in the key-operated orders is best illustrated in Figs. 4 and 5. Referring to Fig. 5, it will be noted that the shaft 251 is provided with a cam 265 adapted to contact a dolly roll 266 located at the top end of a lever 267 pivotally mounted to the frame plates and carrying a link 268 which in turn is pivoted to another lever 269 fixed to a transordinal rock shaft 270 at the forward part of the machine. The rock shaft 270 is provided with an arm 271 for each key operated order of the machine and is so placed as to contact a stud 272 fixed to the link 116 previously described. Thus as the transordinal shaft 251 is rocked in a counterclockwise direction as shown in Figs. 4 and 5 by movement of the conditioning lever 250, the link 116 is pulled forwardly to cause engagement of the hooks 104 in each of the key-operated orders with its corresponding toothed wheel 90 and thus to impart ten units of adding movement to each of the sector gears 71 in those orders, thus to rotate the register wheels 360°.

Since to set the machine for the opposite form of operation to which it has previously been set requires that all orders of the accumulator mechanisms in the carriage be provided with actuating means to turn the gears 47 through 180° to rotate the register wheels 360°, the carriage must be positioned prior to the operation of the conditioning lever 250 in a location where each of the accumulator mechanisms in the carriage is positioned to be operated by an actuating mechanism in the body of the machine. This position is, of course, the leftmost position of the carriage. Means are provided to prevent operation of the conditioning lever 250, until the carriage has been properly positioned, as stated above, on the machine with each accumulator mechanism of the carriage being in operative engagement with its respective actuating mechanism.

As will be noted from Fig. 19, the carriage mechanism includes a carriage centering and locating device 280 adapted to set in notches 281 provided on the trackway mechanism 41 accurately to locate the carriage opposite the desired actuating mechanism of the calculator. As the carriage is moved to its leftmost position prior to conditioning the calculator for the reverse type of calculation, the locating device 280 contacts a lever arm 282 (see Figs. 6 and 14) fixed to a shaft 283 rotatably mounted in a block 284 secured to the center carriage support bracket. The lower end of the shaft 283 is connected to a lever arm 285 which extends at right angles to the lever 282 and is connected with a link 286 by a flexible connection which will hereinafter be explained. The link 286 extends toward the front of the machine (see Fig. 6) where it is pivotally connected to an arm 287 of a combination stop device and full throw dog 288 pivoted to the machine. With the stop device 288 in the position shown in Fig. 6, it will be apparent that the arm 289 provided thereon serves to prevent forward movement of the conditioning lever 250. As the carriage is shifted into its proper position for operating the conditioning lever (to its leftmost position), the locating device 280 strikes and rotates the lever arm 282 which serves to draw the link 286 rearwardly to rotate the stop device 288 counterclockwise (as seen in Fig. 6) to a position wherein the arm 289 is moved out of the path of movement of the conditioning lever 250 but in a position to ride over the teeth 289a provided on the conditioning lever as the lever is moved forwardly. A full throw of the conditioning lever carries the teeth 289a beyond the arm 289 whereupon the spring 289b rotates the arm 289 to a position permitting return of the lever.

As in my previous Patent 2,241,102, the calculator is provided with a lock lever 290 so connected to a rotatable shaft 291 as to produce a counterclockwise rotation (as seen in Fig. 6) of the shaft with clockwise rotation of the lever 290, with the lever extending over a lip 292 formed in the front edge of the carriage. As the carriage is lifted at its front end, i. e. rotated anticlockwise as seen in Fig. 6, prior to shifting the carriage transversely across the machine, the lever 290 is rocked forwardly by the camming action of the rounded front edge of the carriage and thus serves to rotate the shaft 291. In order to insure that the carriage has not only been moved to its leftmost position prior to operating the conditioning lever 250 but also that the carriage has been properly centered in that position, a latch 293 is secured to the shaft 291 and is provided with a notch 294 adapted to engage a lug 295 fixed to the conditioning lever 250. Until the carriage has been properly centered, the notch 294 is in engagement with the lug 295 to prevent movement of the conditioning lever. As the carriage reaches its proper position, the lever 293 moves to the position shown in Fig. 6 freeing the conditioning lever 250.

As the conditioning lever 250 is moved forwardly the lug 295 slides along an arcuate extension 296 provided on the lever 293 and thus the shaft 291 is held against rotation and hence movement of the lock lever 290 is prohibited, thus preventing movement of the carriage during operation of the conditioning lever.

In order to permit the actuating mechanism to unwind one set of carrying springs and to wind up the other set through the medium of the actuating mechanism, it is obvious that means must be provided to prevent rotation of the carrying cams during the unwinding and rewinding operations. To this end the conditioning lever shaft 251 is provided with a cam 300 (see Fig. 12) secured thereto and adapted to contact a dolly roll 301 secured to an intermediate point on a lever 302 which has its lower end pivoted to a shaft 303 provided in the frame plates. The upper end of the lever 302 is pivotally connected by a link 304 to a downwardly extending arm 305 of a lever 306 mounted upon a shaft 307. The upper end 308 of the lever is so positioned that when the carriage is in its leftmost position a pin 309 secured to an arm 310 fixed to a transordinal rock shaft 311 rotatably mounted in the carriage is in position to be contacted by the arm 308 as the lever 306 is rocked in a clockwise direction (as seen in Fig. 12) with rotation of the conditioning shaft 251. Such rocking of the lever 306 serves through the medium of the connections just described to rotate the transordinal shaft 311 in a counterclockwise direction. The shaft 311, while normally a round shaft, has portions cut away in each order, leaving a flat surface adapted to cooperate with lock levers 312 provided in each order. Each lock lever has its lower end pivoted to the carriage frame and is provided with a pin 313 at its upper end adapted to cooperate with the V notches of the teeth provided about the periphery of the carrying cams 224 (see Fig. 16). The engagement of the pins 313 with the V notches on the cams locks all of the cams against rotation preparatory to the unwinding of one set of carrying springs and the winding of the opposite set of carrying springs.

Inasmuch as shifting the calculator for positive or negative operation entails a slight movement of the carriage transversely of the calculator to cause engagement between each of the gears 48 with either the gear 203 or the gear 204 of the ratchet mechanisms, means are provided for accomplishing the shift each time the conditioning lever 250 is operated. Referring to Figs. 7 to 9, inclusive, a small sector gear 320 is fixed to the transordinal conditioning shaft 251 and meshes with a like sector gear 321 rotatably mounted upon a stud 322 secured to one of the support plates 30, with the ratios of said sectors being such that the motion imparted to the gear 321 from a full throw of the sector gear 320 is 60° or one-sixth of a revolution. The sector 321 is provided with an arm 323 upon which a spring pressed dog 324 is pivotally mounted with the dog being adapted to engage a routed or recessed cam wheel 325 rotatably mounted upon the stud 322. The cam wheel 325 is provided with six notches 326 shaped to receive the dog 324 and a back stop pawl 327. The cam wheel 325 is provided with a routed or recessed cam slot 328 serving as a runway for a dolly roll 329 rotatably mounted upon a lever 330 pivoted on a shaft 331 and connected at its upper end with a link 332 which extends rearwardly and is pivoted to an arm 333 made fast to a short perpendicular shaft 342 (Figs. 19A and 19B) extending upward through a bearing 334 fixed in a long plate 335 fastened to the carriage support brackets (see Fig. 19). The plate 335 forms a part of the trackway 41 and provides a support and guide for an overlying plate 336 which is slidable thereover. The overlying plate 336 carries the centering bar 337 which is provided with the notches 281 cooperable with the carriage centering and locating device 280 as previously described. The overlying bar 336 is also provided with elongated slots 338 adapted to receive flange head studs 339 secured to the underlying elongated bar 335 to hold the overlying bar against displacement during its longitudinal movement therealong.

The upper end 341 of the shaft 342 carries an arm 343 which is formed of a special shape (see Fig. 19A) and extends through an opening 340 in the overlying or carriage centering plate 336. The opening 340 in plate 336 is provided with a transverse slot 344 adapted to receive the arm 343 so that as the arm 343 is moved forward and back it will shift the carriage centering plate 336, and hence the carriage, transversely an amount great enough to cause the gears 48 to engage either with the gears 203 or the gears 204. The actual movement is approximately 0.76 inch. Thus, if the shaft 342 is rotated anti-clockwise (as seen in Fig. 19A), it serves to shift the carriage transversely to cause the gears 48 to shift out of engagement with the gears 203 and immediately into engagement with the gears 204. The cooperation between the arm 343 and the notch 344 provides, in effect, a one tooth rack and pinion movement not only to move the plate 336 relative to the plate 335 but also to control the amount of motion allowed for the movable plate.

Turning again to Fig. 7, a short link 350 is also pivoted to the upper end of the lever 330 and extends forwardly therefrom. The forward end of the link 350 is pivotally attached to an arc shaped sector 351 pivotally mounted at its lower end upon a stud 352 mounted in the left-hand frame plate of the order shown. The arc shaped sector is provided with an arc shaped flange 353 carrying the terms "Pos." and "Neg." marked upon it and so placed as to register with an aperture 354 in the top of the casing to indicate visually the form of calculation for which the machine is set. As can be seen from an inspection of Fig. 7, the shape of the routed cam runway 328 is such that as the cam 325 is rotated one-sixth of a revolution during an operation of the conditioning lever 250, the lever 330 will have been swung forward pulling the link 332 with it and shifting the lever arm 333 to which the rear end is pivoted (see Figs. 19, 19A and 19B) thereby to shift the carriage so that all of the gears 48 will be shifted from their formerly meshed relations with the gears 203 to a meshed relation with the reverse gears 204 and in the meantime the term "Pos." will be changed to "Neg." Likewise, if the conditioning lever is again pulled forwardly the cam wheel 325 is again rotated to rotate the shaft 342 to shift the carriage so that the gears 48 again engage with the gears 203.

Figure 18:
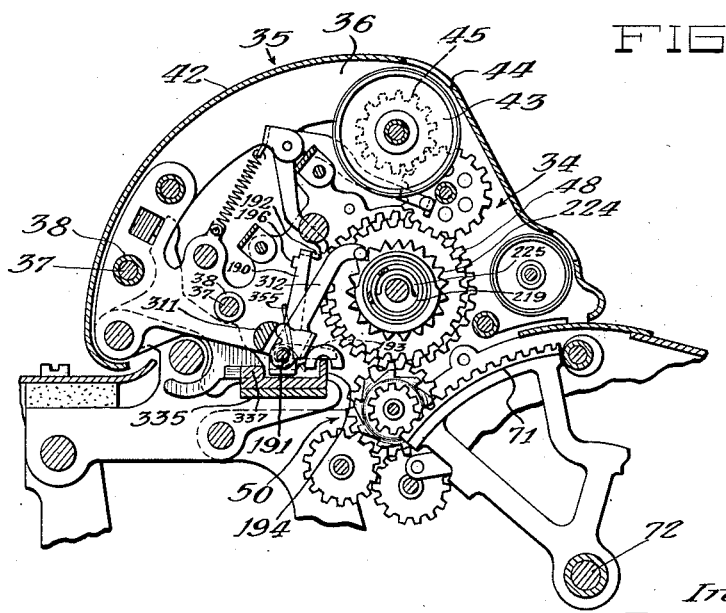
Fig. 18 is a view showing how the carrying cams of the accumulator mechanism are locked while the carrying spring action is being wound for reverse actuation.

As will be seen from Fig. 18, the carrying cam locking levers 312 are pivoted on the same shaft as the lock levers 190 and a common torsion spring 355 is wound about the shaft 191 and has its two ends contacting each of the levers 190 and 312 and serves to disengage the lock lever 312 from the V notches of the carrying cam 224 as the transordinal shaft 310 is rocked to the position shown in Fig. 12. This same spring 355 moves the detents 192 of the lock levers 190 into engagement with the teeth on the gears 48 as the carriage is lifted to prevent rotation of the gears until the carriage is lowered and gears 48 again engage with gears 203 or 204.

Referring to the last named figure, it will be noted that the link 304 is provided with a latch tooth 360 which cooperates with a latch bale 361 which extends across three of the leftmost orders of the conditioning actuating mechanism. The bale serves to catch and hold the latch tooth 360 as the conditioning lever 250 reaches the limit of its forward throw. Engagement of the bale 361 with the latch tooth 360 holds the link 304 in its forward position. Operation of the link 70 causes cam lugs 362 formed thereon to be pulled out from under the latch bale 361. Thus all locking levers 312 are held in locked engagement with the carrying cam notches until the cams 362 of the actuating links 70 have finished their actuation of the sectors 71 and returned to normal. This return to normal will raise the bail 361 to release the link 304 and arm 305 and in turn will allow the rock shaft 311 to return under the force of springs 364 to its normal position.

Turning now to Fig. 5, it is clear that if the key 151 had been left set for use in multiplication or division and it is desired to shift to addition or subtraction, is is necessary to elevate that key to change the setting to key-responsive before a power actuation is allowed to take place. To insure that such resetting of the key 151 is accomplished a cam 370 is secured to the conditioning shaft 251 and cooperates with a dolly roll 371 mounted on the top end of a lever 372 having its lower end pivoted to the frame and connected by a link 373 to the lower arm 157 of the walking beam lever 152. Thus if the key 151 is depressed, leaving the machine key-set, when the conditioning lever 250 is pulled forward to reverse the form of calculation the link 373 connected to the lower arm 157 having been swung rearward by such movement of the conditioning lever will, through contact of the cam 370 with the dolly roll 371, rotate the walking beam lever about its pivot point 153 to elevate the key 151 and simultaneously depress the key 150.

The zeroizing means described in my previous Patent 2,241,102 are reemployed in the present calculator. However, as the zeroizing mechanism should not be operated when the machine carries a total in the register to be used in a following negative calculation, means are provided to prevent operation of the zeroizing mechanism 200 when the machine is then set for such negative calculation. Inasmuch as negative calculation is dependent upon a register total in the accumulator mechanism obviously it is neither necessary nor desirable to zeroize the accumulator when performing negative operations.

As seen in Fig. 7, a small sector gear 380 is rotatably mounted upon one of the spacing bushings 32 provided in the transverse brace rods for the frame and is provided with a downwardly extending arm 381, the lower end of which is housed between two right angle lugs 382 formed on the rear end of the link 332. The sector 380 is provided with teeth which mesh with a gear 383 formed on a sleeve rotatably mounted in the center carriage bracket (see Fig. 19) with the shaft 184 passing through it far enough to fasten a one trundle lantern pinion 384 to the sleeve. Turning to Figs. 5 and 10, it will be noted that an arm 385 is made fast to a transordinal shaft 386 and has a bifurcated jaw 387 at its lower end which straddles the trundle of the lantern pinion 384 (Figs. 5 and 19). The transordinal shaft 386 extends through the carriage framework to the right end thereof where it is provided with a latch arm 388 fixed thereto, the latch end of which extends forward through a specially formed recess 389 in the arm of the zeroizing lever 200 forming a catch 390 for the zeroizing lever. A rearward extension 391 of the latch 388 is provided with a pointed V-shaped end 392 adapted to coact with a spring pressed lever 393 provided with two V-shaped notches 394 to center and hold the latch 390 in either locked position with the zeroizing lever 200 or in an unlocked position. As shown in Fig. 7, the link 332 occupies the position it attains when the machine is set for positive actuation. When it is thrust forward by operation of the conditioning lever it pulls the arm 381 forward with it causing the gear sector 380 to rotate the gear 383 and its trundle pinion to rotate anticlockwise as viewed in Figs. 5 and 7 so that the trundle rocks the bifurcated arm 385 and the shaft 386 clockwise causing the latch 390 to be set as shown in Fig. 10. Setting the latch 390, of course, prohibits pivotal movement of the zeroizing lever 200 in a forward direction.

The cam recess 328 which serves to operate the link 332 is so formed that each time the conditioning lever 250 is drawn forwardly the machine is set either from positive to negative or vice versa depending upon the manner in which the machine was set prior to the operation of the conditioning lever. In all cases, operation of the conditioning lever serves to set the machine for the opposite form of calculation.

In describing the unlocking of the conditioning lever 250 as the carriage is moved to its leftmost position reference was made to the elastic connection between the arm 285 and the link 286. To provide this connection, the link 286 is provided with a U-shaped end portion having two legs 286a and 286b embracing the end of the arm 285. A spring 286c is secured at one end to a pin 285a and at its other end to an upstanding arm 286d formed on the link 286. Thus, the leg 286b and the arm 285 are constantly biased toward each other by the spring but the spacing between the legs 286a and 286b permits some relative movement between the arm 285 and link 286. In view of the fact that the action of the arm 285 is regulated by movement of the arm 282 and the movement of that arm may vary by as much as .076 inch depending upon the setting of the machine leaves an allowance of something slightly less than .076 inch to be permitted in the spring tensioned slip connection between the lever arm 285 and the legs on the U-shaped end portion of the link 286. This tensioned slip connection is adapted to give way when the combination stop device and full throw dog 288 is swung into action against its stop pin 288a wherein it is ready to cooperate with the teeth 289a provided on the conditioning lever to insure that full throw of the lever has occurred. When, however, the carriage is shifted from the leftmost position the arm 282 is freed from the pressure of the centering latch 280 allowing the link 286 to return under its spring 286c until the full throw dog is back to the position illustrated in Fig. 6 thereby relocking the conditioning lever until the carriage is again in its leftmost position.

From the preceding specification it should be recognized that the carrying mechanism shown is of the automatic type and the carry of tens is accomplished by automatic means independent of the ordinal actuating mechanisms, as distinguished from the push-over type having a universal actuator operable to rotate the register wheels both in ordinal and in carrying movements.

In operating the calculating machine of this invention let it be assumed that some form of positive calculation has just been completed so that a total stands on the register wheels in the accumulator mechanism. To shift to negative forms of calculation it is first necessary to move the carriage to its leftmost position on the machine. For this purpose the carriage is tilted counterclockwise to free the gears 48 from the gears on the body portion of the machine and the carriage is slid to its leftmost position and reseated. Upon arriving at the leftmost position the hook arm 280 contacts the lever arm 282 to release the dog 289 and thus to free the conditioning lever for movement. Inasmuch as the register wheel associated with each actuating mechanism is to be rotated 360° and thus must be in a position to be actuated thereby, the means just described prevent operation of the conditioning lever until the carriage is in its leftmost position at which time the required condition prevails. When the carriage has reached its leftmost position the conditioning lever is free and may be moved forwardly. Such movement causes engagement of the hooks 104 to each wheel 90 and thus causes the actuating mechanism to rotate each register wheel through 360°. The rotation of the register wheel is in a direction reverse to the direction of rotation during the previous positive calculation inasmuch as prior to the rotation of the wheels the operation of the lever 250 through gear sectors 320 and 321 rotate the shaft 342 to shift the carriage slightly to move the gears 48 of the accumulator mechanism out of engagement with the additive gears 203 and into engagement with the subtractive gears 204. When this has been accomplished subsequent depression of a key in one of the ordinal columns will cause its associated actuating mechanism, including the gear 204, to rotate its associated register wheel in a reverse direction, that is, to subtract. Carry of decrements to the next higher register wheel is accomplished through the accumulator mechanism described.

I claim:

1. In a key responsive calculating machine, a carriage shiftably mounted on the machine, an accumulator mechanism in the carriage and having a plurality of denominational orders of rotatable register wheels, gear means for rotating the wheels, dual carrying springs in each order of the accumulator mechanism, means connecting the springs with the next lower order of accumulator mechanism and with the register wheel in the next higher order, one of said springs being wound as the register wheel in said next lower order is rotated in one direction to store power therein to carry increments to said register wheel in said next higher order and the other of said springs being wound as the register wheel in said next lower order is rotated in the opposite direction to store power therein to carry decrements to said register wheel in said next higher order, a plurality of denominational orders of actuating mechanism, means for operating said actuating mechanism, digital columns of ordinal marked keys for initiating operation and controlling the degree of actuation of said actuating and accumulating mechanism in accordance with the marking on the keys, gear means connecting the actuating mechanism to the accumulator mechanism, said gear means having a first gear rotated in one direction and a second gear rotated an equal amount in the opposite direction with each operation of the actuating mechanism, and means for shifting the carriage to connect the accumulator mechanism with either of said gears and auxiliary spring winding mechanism for conditioning the springs for positive and negative calculation.

2. The calculating machine of claim 1 in which the number of orders of actuating mechanism is equal to the number of orders of accumulator mechanism and in excess of the number of columns of ordinal keys and in which said spring winding mechanism includes a movable conditioning lever and means operated by the lever to connect each order of the actuating mechanism with said means for operating the actuating mechanism to rotate each of the register wheels through 360° to unwind one of said carrying springs and simultaneously wind the other of said springs.

3. The calculator of claim 2 including lock means for locking said lever against movement and release means operating to release the lock means as the carriage is shifted to engage each order of the accumulator mechanism with a respective order of the actuating mechanism.

4. In a key responsive calculating machine, in combination, denominational orders of actuating mechanisms, an accumulator mechanism having denominational orders of rotatable register wheels, said accumulator mechanism having automatic carrying mechanism having means in each order for storing power as said register wheels are rotated including a pair of oppositely wound springs, one of which is torsioned by rotation of the register wheels in one direction, and the other of which is torsioned by rotation of the register wheels in the opposite direction, means operated by the springs in each order for rotating the register wheel in the next higher order, said accumulator mechanism including an escapement device for releasing one or the other of said springs to permit said spring operable rotating means to rotate the register wheel in the next higher order in the same direction as the register wheel in the lower order was rotated during the storage of power, a first gear train connected to the actuating mechanism and adapted to be connected to the register wheels for rotating the wheels in one direction for positive calculation, a second gear train connected to the actuating mechanism and adapted to be connected to the register wheels for rotating the wheels in the opposite direction for negative calculation, means for conditioning the machine for positive or negative calculation including a shifting device for connecting the accumulator mechanism to either of said gear trains and means for relieving the torsion of a partially wound spring in each pair and simultaneously torsioning the other spring in such pair.

5. The calculating machine of claim 4 in which said relieving and torsioning means includes means for rotating each of the register wheels through 360° whereby to unwind a partially torsioned spring and to wind an untorsioned spring in each pair.

6. The calculating machine of claim 5 in which said automatic carrying mechanism includes a carrying cam in each order rotatable to operate the escapement device to permit said spring operable rotating means to carry increments or decrements to the next higher order and including means for locking said cams against rotation while said register wheels are being rotated said 360°.

7. In a calculating machine having an accumulator mechanism including a plurality of numbered rotatable register wheels, an actuating mechanism and means connecting the actuating mechanism to the register wheels and including a reversing mechanism selectively operable to rotate said wheels forwardly in positive calculation and reversely in negative calculation, in combination, an automatic carrying mechanism between each order of the accumulator mechanism, said automatic carrying mechanism having power storage means including a first power storage device in which power is stored during rotation of the wheels in one direction and a second power storage device in which power is stored during rotation of the wheels in the other direction, means connecting each power storage means to the register wheel in the next lower order for energizing said power storage means with rotation of said last mentioned register wheel, means connecting each power storage means with the register wheel in the next higher order, means for releasing said power storage means including detents engaging the last mentioned connecting means and operating to hold said last mentioned connecting means against movement, and cam means movable with the register wheel for moving the detents out of holding engagement with the last mentioned connecting means to release the same to carry increments of tens to said register wheel in the next higher order as the register wheel in the next lower order passes forwardly from 9 to 0 and to carry decrements of tens to said register wheel in the next higher order as the register wheel in the next lower order passes reversely from 0 to 9, and manually operable means for conditioning the calculator for positive and negative forms of calculation including means for adjusting said selectively operable reversing mechanism.

8. In a key responsive calculating machine, in combination, an accumulator mechanism having denominational orders or rotatable register wheels, means for rotating the wheels in one direction as increments are added and in the opposite direction as decrements are subtracted, an automatic carrying mechanism for each order including power means energized by a lower order and operable to actuate a higher order of said accumulator mechanism to produce a carry of increments to or a subtraction of decrements from said higher order, denominational orders of key responsive actuating mechanism, means connecting the actuating mechanism to the means for rotating the wheels and including a selectively operable reversing mechanism to rotate said wheels in either of said directions, means for zeroizing the register wheels, means for conditioning the calculating machine for positive and negative calculation including means for adjusting said reversing mechanism, and means for preventing operation of said zeroizing means when said conditioning means is set to condition the calculator for negative calculation.

9. In a calculating machine of the key responsive type, an ordinally arranged accumulator mechanism including a plurality of rotatable register wheels, differential actuating means immediately responsive to depression of the keys for rotating the wheels in one direction for positive calculation and for rotating the wheels in the opposite direction for negative calculation, automatic carrying mechanism for each order of the accumulator mechanism including a pair of opposed motor type springs for each order of the accumulator mechanism, means for winding one of the springs in one direction as a register wheel is rotated in positive calculation and for winding the other spring in the opposite direction as a register wheel is rotated in negative calculation, means operable by the springs in each order for rotating the register wheel in the next higher order, an escapement device for each order of the accumulator mechanism and connected to each of said springs, said escapement device including a detaining device and cam means for releasing each detaining device when a register wheel passes from 9 to 0 in positive calculation or from 0 to 9 in negative calculation whereby power stored in a wound spring is delivered to the spring operated rotating means of the next higher order of the accumulator mechanism to carry tens to said higher order in positive calculation or to subtract tens from said higher order in negative calculation, and means for conditioning the calculator to produce rotation of said register wheels in either of said directions, said conditioning means including means for relieving the tension in a spring partially wound during rotation of a register wheel in its order and simultaneously partially winding the other spring in said order.

10. In a key responsive calculating machine having a plurality of key responsive orders of actuating mechanisms, an accumulator mechanism having denominational orders of rotatable register wheels, means for conditioning the machine for positive and for negative forms of calculation, means connecting the actuating mechanism to the accumulator mechanism for rotating the wheels in one direction when the machine is conditioned for positive calculation and in the other direction when the machine is conditioned for negative calculation, automatic carrying mechanism for each order of the accumulator mechanism including power storage means connected to the register wheel in each order and energized by actuation of said register wheel, said energized power storage means being biased according to the direction of rotation of said wheel, means connecting the power storage means in each order to the register wheel in the next higher order and adapted to rotate the last named wheel to carry increments to said next higher order when the machine is conditioned for positive calculation and to carry decrements to said next higher order when the machine is conditioned for negative calculation, said means for conditioning the calculating machine for positive and negative calculation including means operable independently of said keys for actuating all of said actuating mechanisms to rotate the register wheels connected thereto through 360° to reverse the bias of the power storage means.

11. In a key responsive calculating machine, a plurality of denominational orders of key responsive actuating mechanisms, a reversible ordinal accumulator mechanism, means connected to said actuating mechanisms and adapted to transmit increments or decrements to said accumulator mechanism in accordance with the marking of the keys depressed, automatic carrying mechanism for the accumulator mechanism including a pair of springs for each order, means for winding one of the springs in each order as increments are transmitted to the associated order of the accumulator mechanism and for winding the other spring in said order as decrements are transmitted to said order of the accumulator mechanism, means operable by the springs in each order to incrementally advance the accumulator mechanism in the next higher order, means for releasing a wound spring to carry increments or decrements of tens to said next higher order of the accumulator mechanism, and means for conditioning the calculator for positive and negative forms of calculation including means for releasing the tension in a spring partially wound during transmittal of increments to its associated order of the accumulator mechanism and simultaneously partially winding the other spring in said order.

12. In a motor operated key responsive calculator, an ordinally arranged reversible accumulator mechanism including a rotatable register wheel for each order, ordinal actuating means for transmitting increments and decrements to the accumulator mechanism, power storage means in each order of the accumulator mechanism and connected to the register wheel therein, said power storage means being energized upon rotation of the register wheel in its associated order with a bias determined by the direction of rotation of said wheel, means connecting each power storage means with the register wheel in the next higher order of the accumulator mechanism to carry increments of one to or subtract decrements of one from the register wheel in said next higher order as the register wheel in the lower order receives increments or decrements in excess of ten, and means for conditioning the calculating machine for positive and for negative calculation including means operable independently of said keys for operating all orders of said actuating means to rotate the register wheels through 360° to reverse the bias of the power storage means.

13. In a key responsive calculating machine, the combination of denominational columns of ordinal actuating mechanism, depressible marked keys for each order and operable to initiate operation of the associated ordinal actuating mechanism, means controlled by the keys for regulating the degree of actuation of the actuating mechanism in accordance with the marking of the keys, dual motion transmitting means connected to each denominational order of the actuating mechanism, one motion transmitting means being adapted to transmit additive actuation and the other motion transmitting means being adapted to transmit subtractive actuation, a carriage shiftably mounted on the machine, a plurality of orders of accumulator mechanism in the carriage in excess of the number of orders of actuating mechanism, each order of said accumulator mechanism including a register device adapted to receive and instantly to register the degree of actuation delivered by the motion transmitting means upon depression of a key, means for shifting the carriage from order to order of the additive motion transmitting means to connect the accumulator mechanism to said additive motion transmitting means for performing positive forms of calculation and from order to order of the subtractive motion transmitting means to connect the accumulator mechanism to said subtractive motion transmitting means for negative forms of calculation, means for zeroizing the register devices, and means for preventing operation of said zeroizing means when said carriage is shifted to connect the accumulator mechanism to the subtractive motion transmitting means.

14. In a key responsive calculating machine having a plurality of columns of ordinally arranged keys and ordinal actuating mechanism responsive to depression of a key, an accumulator mechanism, including, a plurality of orders of rotatable register wheels each numbered from 0 to 9, gears connected to the wheels for rotating the same, means for connecting the gears to the actuating mechanism including a pair of members, one driven forwardly and the other driven reversely by the actuating mechanism, means for causing relative shifting movement between the gears and said members to a first position connecting the gears to the forwardly driven member to rotate the register wheels in adding movement and to a second position connecting the gears to the reversely driven member to rotate the register wheels in subtracting movement, tens transfer mechanism including a pair of motor type carrying springs for each order of register wheels, means connecting each spring to the register wheel in its order and to the register wheel in a higher order of the accumulator mechanism, said connecting means being adapted to wind one of the springs when the register wheel in its order is rotated in adding movement and to wind the other spring when said register wheel in its order is rotated in subtracting movement, release means for releasing a wound spring to carry tens to or from said register wheel in said higher order according to which spring has been wound, and means operated by said shifting means for relieving the tension in a spring partially wound during rotation of a register wheel in its order and simultaneously partially winding the other spring in said order.

15. The accumulator mechanism of claim 14 in which said release means includes a rotatably mounted member secured to said springs and carrying a lug, a pair of detents positioned on opposite sides of the path of rotation of the lug and adapted to engage the lug to prevent rotation of the last mentioned member, a carrying cam rotated by the gears and controlling the detents to release one detent from holding engagement with the lug and simultaneously move the other detent into position to engage the lug, and means connecting the last named member to the gears in the next higher order to rotate the register wheel therein.

16. In a key responsive calculating machine, denominational orders of keys, ordinal actuating mechanism responsive to the depression of a key, an accumulator mechanism including a plurality or orders of movable register devices, means connecting the actuating mechanism to the accumulator mechanism, including, a sector gear connected to the actuating mechanism and oscillated in opposite directions upon depression of a key, a first gear in mesh with the sector gear, a unidirectional clutch connected to the first gear, a pair of intervening gears driven in opposite directions by the clutch with oscillation of the sector gear in one direction, a second gear connected to the accumulator mechanism, means for causing relative shifting movement between said second gear and said intervening gears for engaging the second gear with either of said intervening gears, and means for preventing movement of said register devices during said shifting movement.

17. Apparatus of the character described in claim 16 in which said calculating machines includes a body portion housing the actuating mechanism and all of said gears except said second gear, a carriage shiftably mounted on the body portion and housing the accumulator mechanism and said second gear, and in which said means for causing relative shifting movement comprises means for shifting said carriage to engage said second gear with one or the other of said intervening gears.

18. A key responsive calculating machine comprising a housing; denominational orders of keys in the housing; ordinal actuating mechanism in the housing; a motor in the housing; means operated by the keys for connecting the motor to the actuating mechanism to operate the same upon depression of a key; a carriage shiftably mounted on the housing; an accumulator mechanism in the carriage including a plurality of orders of movable register devices and gear means for moving said devices; means connecting the actuating mechanism to the accumulator mechanism including a sector gear in each order of the actuating mechanism and operated thereby, a pair of paratactical gears of equal pitch diameter and number of teeth, reversing gears interconnecting the paratactical gears to cause the paratactical gears to rotate together in opposite directions, a lantern wheel secured to one of said paratactical gears and rotatable therewith, means connecting said lantern wheel to the sector gear, a ratchet device operably associated with said lantern wheel to permit rotation thereof in one direction only; a centering plate for locating the shiftable carriage relative to said housing; and selectively operable means connected to said centering plate to locate the carriage in a first position for positive calculation wherein the gear means of the accumulator mechanism is in engagement with one of said paratactical gears and to locate the carriage in a second position for negative calculation wherein said gear means is in engagement with the other of said paratactical gears.

19. A key responsive calculating machine comprising a housing; denominational orders of keys in the housing; ordinal actuating mechanism in the housing; a motor in the housing; means operated by the keys for connecting the motor to the actuating mechanism to operate the same upon depression of a key; a carriage shiftably mounted on the housing; an accumulator mechanism in the carriage including a plurality of orders of rotatable register wheels, gear means for rotating the wheels, and automatic carrying mechanism including means in each order of the accumulator mechanism for storing power as said register wheels are rotated including a pair of oppositely wound springs, one of which is torsioned by rotation of the register wheels in one direction and the other of which is torsioned by rotation of the register wheels in the opposite direction, means operated by the springs in each order for rotating the register wheel in the next higher order, said accumulator mechanism including an escapement device for releasing one or the other of said springs to permit said spring operable rotating means to rotate the wheel in the next higher order in the same direction as the spring in the lower order was rotated during the storage of power; means connecting the actuating mechanism to the accumulator mechanism including a sector gear in each order of the actuating mechanism and operated thereby, a pair of paratactical gears of equal pitch diameter and number of teeth, reversing gears interconnecting the paratactical gears to cause the paratactical gears to rotate together in opposite directions, a lantern wheel secured to one of said paratactical gears and rotatable therewith, means connecting said lantern wheel to the sector gear, a ratchet device operably associated with said lantern wheel to permit rotation thereof in one direction only; a centering plate for locating the shiftable carriage relative to said housing; and selectively operable means connected to said centering plate to locate the carriage in a first position for positive calculation wherein the gear means of the accumulator mechanism is in engagement with one of said paratactical gears and to locate the carriage in a second position for negative calculation wherein said gear means is in engagement with the other of said paratactical gears.

20. The calculating machine of claim 19 in which said automatic carrying mechanism includes a detent device in each order movable to operate each escapement device, and a carrying cam in each order of the accumulator mechanism and rotated with the register wheel of its order, said cams being connected to said detent devices to move the same as said register wheel passes from 9 to 0 in positive calculation and from 0 to 9 in negative calculation.

21. The calculating machine of claim 19 including means operated by said selectively operable means to connect each order of the actuating mechanism to said motor to rotate each register wheel through 360° whereby to unwind a partially torsioned spring and wind an untorsioned spring in each pair to transfer the torsion of one spring to the other spring.

22. In a key responsive calculating machine, in combination, an accumulator mechanism including denominational orders of rotatable register wheels, means for rotating the wheels in one direction as increments are added and in the opposite direction as decrements are subtracted, and an automatic carrying mechanism for each order including power storage means energized by a lower order of the accumulator mechanism and operable to motivate a higher order of said accumulator mechanism to produce a carry of increments to or a subtraction of decrements from said higher order; denominational orders of key responsive actuating mechanism including a sector gear in each order, motion transmitting means constantly in mesh with the sector gears and including a pair of members rotated in reverse direction with rotation of the sector gear; means selectively operable to connect either of said members to the means for rotating the wheels to rotate said wheels in either of said directions; a manual shifting device connected to operate said selectively operable means for engaging a selected one of said members to said rotating means to condition the calculator for the transfer of increments or decrements to said register wheels; means for zeroizing the register wheels, and means connected to said shifting device and operated thereby to lock the zeroizing means against operation when the manual shifting device is shifted to condition the connecting means for the transfer of decrements.

23. A key responsive calculating machine having a housing; a plurality of key responsive orders of actuating mechanisms in the housing, each of said orders including a pair of driving gears rotated in opposite directions upon depression of a key in said order; an accumulator mechanism shiftably mounted on the housing having denominational orders of registering devices, each including a register wheel and gear means for rotating the wheel; means for conditioning the machine for positive and negative forms of calculation including means for shifting the accumulator mechanism from a first position for positive calculation in which the gears of each order of said accumulator mechanism are constantly engaged with one of said driving gears in each order of the actuating mechanism to rotate the wheels in one direction with rotation of said one gear, to a second position for negative calculation in which the gears in each order of said accumulator mechanism are constantly engaged with the other of said driving gears in each order of the actuating mechanism to rotate the wheels in the opposite direction with rotation of said other gear; automatic reversible carrying mechanism for each order of the accumulator mechanism operable to carry increments to the next higher order when the machine is conditioned for positive calculation and to carry decrements to the next higher order when the machine is conditioned for negative calculation, said carrying mechanism including power operated carry means operable by the register wheel in each order and connected to the register wheel in the next higher order to rotate the register wheel in said next higher order, and means operated by said conditioning means to condition said power operated carry means to rotate the register wheel in said next higher order in one direction when the machine is conditioned for positive calculation and in the opposite direction when the machine is conditioned for negative calculation.

24. A key responsive calculating machine having a housing; a plurality of key responsive orders of actuating mechanisms in the housing, each of said orders having a pair of driving members driven in opposite directions upon depression of a key in each order; an accumulator mechanism shiftably mounted on the housing having denominational orders of register wheels; means for conditioning the machine for positive and negative forms of calculation including means for shifting the accumulator mechanism from a first position for positive calculation in which each order of register wheels in said accumulator mechanism is constantly engaged with one of said driving members in each order of the actuating mechanism to rotate the wheels in one direction with driving movement of said one driving member, to a second position for negative calculation in which each order of register wheels in said accumulator mechanism is constantly engaged with the other of said driving members in each order of the actuating mechanism to rotate the wheels in the other direction with driving movement of said other driving member, and automatic reversible carrying mechanism for each order of the accumulator mechanism operable to carry increments to the next higher order when the machine is conditioned for positive calculation and to carry decrements to the next higher order when the machine is conditioned for negative calculation, said carrying mechanism including power operated carry means operable by the register wheel in each order and connected to the register wheel in the next higher order to rotate the register wheel in said next higher order, and means operated by said conditioning means to condition said power operated carry means to rotate the register wheel in said next higher order in one direction when the machine is conditioned for positive calculation and in the opposite direction when the machine is conditioned for negative calculation.

References Cited in the file of this patent

UNITED STATES PATENTS

| Number | Name | Date |
|---|---|---|
| 762,521 | Felt | June 14, 1904 |
| 809,075 | Rechnitzer | Jan. 2, 1906 |
| 1,853,054 | Horton | Apr. 12, 1932 |
| 1,926,826 | Turck | Sept. 12, 1933 |
| 2,241,102 | Turck | May 6, 1941 |